United States Patent
Lee et al.

(10) Patent No.: US 9,992,681 B2
(45) Date of Patent: Jun. 5, 2018

(54) SUBSYSTEM FOR AUTHORIZATION AND ACTIVATION OF FEATURES

(71) Applicant: QUALCOMM Incorporated, San Diego, CA (US)

(72) Inventors: Soo Bum Lee, San Diego, CA (US); Gavin Bernard Horn, La Jolla, CA (US); John Smee, San Diego, CA (US); Rajesh Pankaj, San Diego, CA (US); Thomas Rouse, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 15/082,862

(22) Filed: Mar. 28, 2016

(65) Prior Publication Data

US 2017/0041793 A1    Feb. 9, 2017

Related U.S. Application Data

(60) Provisional application No. 62/202,660, filed on Aug. 7, 2015.

(51) Int. Cl.
*H04W 12/08* (2009.01)
*H04L 12/24* (2006.01)
(Continued)

(52) U.S. Cl.
CPC .......... *H04W 12/08* (2013.01); *G06F 21/00* (2013.01); *H04L 41/082* (2013.01); *H04L 41/28* (2013.01);
(Continued)

(58) Field of Classification Search
CPC ........ H04L 12/66; H04W 12/08; H04W 12/06
See application file for complete search history.

(56) References Cited

U.S. PATENT DOCUMENTS 7,131,001 B1   10/2006   Johnson
7,373,138 B2   5/2008    Haub et al.
(Continued)

FOREIGN PATENT DOCUMENTS

WO    WO-0195568 A2      12/2001
WO    WO-2004019182 A2   3/2004

OTHER PUBLICATIONS

International Search Report and Written Opinion—PCT/US2016/041400—ISA/EPO—dated Aug. 30, 2016.

*Primary Examiner* — Myron K Wyche
(74) *Attorney, Agent, or Firm* — Loza & Loza LLP

(57) ABSTRACT

One or more selectively activated features needed at a device to use a network service may be identified. Authorization information and feature activation key(s) associated with features that the device has been authorized to activate may be obtained at the device. The feature activation key(s) may be used to activate and/or maintain activation of the authorized features that match the selectively activated feature(s) needed to use the network service. An authorization server may obtain a request to activate one or more selectively activated features of a device. The authorization server may verify that the selectively activated feature(s) are authorized to be used at the device based on an authorization agreement obtained at the authorization server. The authorization server may send proof that the device is authorized to use e selectively activated feature(s) and may send feature activation key(s) based on the authorization agreement in response to the request.

39 Claims, 17 Drawing Sheets

(51) Int. Cl.
  *G06F 21/00* (2013.01)
  *H04W 12/06* (2009.01)
  *H04L 29/06* (2006.01)
  *H04W 76/02* (2009.01)
  *H04W 88/02* (2009.01)
  *H04W 88/08* (2009.01)

(52) U.S. Cl.
  CPC .............. *H04L 63/10* (2013.01); *H04W 12/06* (2013.01); *H04L 63/062* (2013.01); *H04L 65/1016* (2013.01); *H04L 67/42* (2013.01); *H04W 76/023* (2013.01); *H04W 88/02* (2013.01); *H04W 88/08* (2013.01)

(56) References Cited

U.S. PATENT DOCUMENTS

| | | |
|---|---|---|
| 7,899,754 B2 | 3/2011 | Ripberger et al. |
| 8,165,963 B2 | 4/2012 | Foster |
| 8,417,641 B1 | 4/2013 | Wiltgen et al. |
| 8,627,439 B2 | 1/2014 | Laasik |
| 8,898,469 B2 | 11/2014 | Chan et al. |
| 9,100,548 B2 | 8/2015 | Akins, III et al. |
| 2002/0032872 A1* | 3/2002 | Jussy .................. H04L 12/66 726/7 |
| 2005/0044367 A1 | 2/2005 | Gasparini et al. |
| 2009/0086980 A1 | 4/2009 | Glendinning |
| 2014/0297865 A1 | 10/2014 | Deore et al. |

* cited by examiner

| Date of Agreement | Identifier of owner of device | Identifier of manufacturer or OEM | Identifier of device (e.g., IMEI) | Authorized Feature(s) | Duration of Agreement | Limitations on Use | Fee |
|---|---|---|---|---|---|---|---|
| May 16, 2015 | Service Provider A | Corporation X | 12-123456-654321-8 | MIMO SU-MIMO MU-MIMO | Six months | 500,000 simultaneous users; not authorized for use with roaming partners L, M, N. | Y US Dollars |

FIG. 4

| Start Date | End Date | Device Identifier (e.g., IMEI) | Authorized Feature(s) | Limitation | Public Key identifier | Identifier of manufacturer or OEM | Fee |
|---|---|---|---|---|---|---|---|
| May 16, 2015 | November 16, 2015 | 12-123456-654321-8 | MIMO SU-MIMO MU-MIMO | 500,000 simultaneous users; not authorized for use with roaming partners L, M, N. | KeyID 1083 Certificate Holder A | Corporation X | Y US Dollars |
| June 5, 2015 | July 5, 2015 | 21-789101-111009-6 | MIMO | None | KeyID Aoe44 Certificate Holder J | Corporation X | Z US Dollars |
| May 9, 2015 | None | 16-111213-157892-0 | MIMO SU-MIMO | 250,000 simultaneous users | KeyID 092834 Certificate Holder H | Corporation X | W US Dollars |
| November 22, 2015 | November 22, 2017 | 18-843095-987123-4 | MIMO | 500,000 simultaneous users; not authorized for use with roaming partners L, M, N. | KeyID 01834jj Certificate Holder A | Corporation X | Y US Dollars |
| ... | ... | ... | ... | ... | ... | ... | ... |
| Month, day, year | Month, day, year | Identifier N | Feature(s) N | Limitation N | Identifier N | Corporation X | N US Dollars |

SUBSYSTEM FOR AUTHORIZATION AND ACTIVATION OF FEATURES

This application claims priority to United States Provisional Application No. 62/202,660 filed Aug. 7, 2015, titled Subsystem For Authorization And Activation Of Features, the contents of which are incorporated by reference herein.

FIELD

The present application relates to communication networks, and more specifically to ways to dynamically authorize and selectively activate one or more features on one or more devices to facilitate use of a network service at, and/or provision of the network service to, one of the one or more devices.

BACKGROUND

Most communication devices (e.g., chip components, client devices, network nodes) offer multiple features. The features may be implemented in hardware and/or software.

Some features of a communication device may be activated, when an entity obtains the communication device. Other features may not be activated. For example, it may be possible for a manufacturer, subcomponent manufacturer, or original equipment manufacturer (OEM) to produce different models (e.g., versions) of a communication device that has one or more features included in the communication device, where the one or more features are activated or deactivated based on the device model. Consequently, a subset (e.g., less than an entire set) of the features of the communication device may be operative in a final product. For example, a manufacturer may activate a feature in a first model but not activate the feature in a second model, even though both models include all hardware and software used to implement the feature. Additionally or alternatively, portions of processing circuit readable instructions stored on the communication device may not be executed to preclude a feature from activation. Enabling and/or disabling hardware and/or software increases and/or decreases a number of features that are activated in a final product and may, for example, affect the price of the final product.

Accordingly, when a communication device is deployed, the communication device may be capable (e.g., in terms of hardware and/or software or firmware) of performing certain features as a part of its operation but may not be authorized to use the certain features. Limits on authority to use the features may be based, for example, on a purchase agreement that limits uses of features and/or services available to the communication device.

SUMMARY

The aspects disclosed herein provide methods and apparatus for authorization and activation of selectively activated features of electronic devices.

According to one aspect, a method operational at a device may include identifying one or more selectively activated features needed at the device to use a network service. The method may further include obtaining authorization information and one or more feature activation keys associated with features that the device has been authorized to activate. The device may use the one or more feature activation keys to activate and/or maintain activation of the features that the device has been authorized to activate that match the one or more selectively activated features needed to use the network service. Prior to identifying the one or more selectively activated features needed to use the network service, the method may further include obtaining information that indicates the network service is available from a network access node. The one or more selectively activated features may be hardware and/or software features.

In an aspect, the method may include sending the authorization information to another device and/or node as proof that the device is authorized to activate a feature identified in the authorization information. In some implementations, obtaining the authorization information and one or more feature activation keys may include sending a request to authorize activation of one or more features, obtaining the authorization information and one or more feature activation keys in response to the request, and storing the authorization information and feature activation keys at the device. According to one example, the authorization information includes, for features that the device has been authorized to activate, a date upon which authorization will expire. In some implementations, the authorization information is obtained as data representative of an authorization certificate. The authorization certificate may be signed by an authorization server that stores an authorization agreement from which the authorization certificate is based. In some implementations, identifying the one or more selectively activated features needed to use the network service, may include obtaining, from a network access node or from a memory circuit of the device, a list of features needed to use the network service. In an aspect, at least one of the selectively activated features needed to use the network service is licensable upon use and is activated when verification of an up-to-date license is obtained at the device.

In one aspect, there is described herein a device including a network communication circuit that may communicate with a network node and may also include a processing circuit coupled to the network communication circuit. The processing circuit may be configured to identify one or more selectively activated features needed at the device to use a network service. The processing circuit may further be configured to obtain authorization information and one or more feature activation keys associated with features that the device has been authorized to activate. The processing circuit may still further be configured to use the one or more feature activation keys to activate and/or maintain activation of the features that the device has been authorized to activate that match the one or more selectively activated features needed to use the network service. According to an aspect, the processing circuit may still further be configured to obtain information that indicates the network service is available from a network access node. The information may be obtained prior to identifying the one or more selectively activated features needed to use the network service. In an aspect, the processing circuit may also be configured to send the authorization information to another device and/or node as proof that the device is authorized to activate a feature identified in the authorization information.

Another aspect described herein provides a method that is operational at a device. The method may include obtaining an over-the-air broadcast identifying a network service that is available from a network access node. The method may further include identifying one or more selectively activated features needed by the device to use the network service and identifying features that the device has been authorized to activate. In an aspect, the device may determine if a match exists between the identified one or more selectively activated features needed by the device to use the network service and features that the device has been authorized to activate. The method may still further include using, if the match exists, feature activation keys of the features that the device has been authorized to activate to activate and/or maintain activation of the features that the device has been authorized to activate that match the identified one or more selectively activated features needed by the device to use the network service. In some implementations, prior to receiving the over-the-air broadcast, the method may also include obtaining authorization information and one or more feature activation keys used to activate and/or maintain activation of one or more selectively activated features that the device has been authorized to activate. In one example, the network access node (from which the over-the-air broadcast is received) is unauthenticated and is not attached to the device.

In some implementations, the method may further include identifying, from the identified one or more selectively activated features needed by the device to use the network service, features that the device has not been authorized to activate. A request for authorization information and feature activation keys for the features that the device has not been authorized to activate may be sent and feature activation keys, obtained in response to the request, may be used to activate the features that the device has not been authorized to activate. In some implementations, the over-the-air broadcast is responsive to a query sent from the device that identified the one or more selectively activated features needed on the device to use the network service. In an aspect, identifying the one or more selectively activated features needed on the device to use the network service may include obtaining, from a memory circuit of the device or from the network access node, a list of features needed to use the network service.

In one aspect, there is described herein a device including a network communication circuit that may communicate with a network access node and may also include a processing circuit coupled to the network communication circuit. The processing circuit may be configured to obtain an over-the-air broadcast identifying a network service that is available from the network access node, identify one or more selectively activated features needed by the device to use the network service and identify features that the device has been authorized to activate. The processing circuit may further be configured to determine if a match exists between the identified one or more selectively activated features needed by the device to use the network service and features that the device has been authorized to activate. If the match exists, the processing circuit may be configured to use feature activation keys of the features that the device has been authorized to activate to activate and/or maintain activation of the features that the device has been authorized to activate that match the identified one or more selectively activated features needed by the device to use the network service. In some implementations, prior to receiving the over-the-air broadcast, the processing circuit may obtain authorization information and one or more feature activation keys used to activate and/or maintain activation of one or more selectively activated features that the device has been authorized to activate. In some implementations, the processing circuit may be further configured to identify, from the identified one or more selectively activated features needed by the device to use the network service, features that the device has not been authorized to activate. The processing circuit may then send a request for authorization information and feature activation keys for the features that the device has not been authorized to activate and use feature activation keys, obtained in response to the request, to activate the features that the device has not been authorized to activate.

Another aspect of the disclosure provides a method that may be operational at an authorization server. The method may include obtaining, at the authorization server, a request to activate one or more selectively activated features of a device. The method may further include verifying that the one or more selectively activated features are authorized to be used at the device based on an authorization agreement obtained at the authorization server. The method may still further include sending proof that the device is authorized to use the one or more selectively activated features and one or more feature activation keys based on the authorization agreement in response to the request to activate one or more selectively activated features. In an aspect, the method may also include sending updated capability information of the device to a home subscriber server (HSS) of a network of the device. In some aspects, the authorization server is different from the HSS and different from an authorization, authentication, and accounting (AAA) server. In some implementations, the method may further include evaluating integrity information of the device, and sending the proof that the device is authorized to use the one or more selectively activated features and one or more feature activation keys if the integrity information Is acceptable. The integrity information may be obtained from a first server by the authorization server, where the authorization server and the first server are different servers. In an aspect, the first server may be a proxy for the authorization server. In some implementations, the method may further include receiving periodic feature activation and usage status data from devices receiving feature activation authorizations from the authorization server, and enforcing authorization agreements by controlling feature activation authorizations based on terms of the authorization agreements stored in the authorization server.

In another aspect, there is described herein an authorization server including a network communication circuit that may communicate with a network access node and a processing circuit coupled to the network communication circuit. The processing circuit may be configured to obtain a request to activate one or more selectively activated features. The processing circuit may verify that the one or more selectively activated features are authorized to be used at the device. In an aspect, the processing circuit may further be configured to send proof that the device is authorized to use the one or more selectively activated features and one or more feature activation keys in response to the request to activate one or more selectively activated features. The processing circuit may further be configured to send updated capability information of the device to a home subscriber server (HSS) of a network of the device. In some implementations, the processing circuit may still further be configured to evaluate integrity information of the device, and may send the proof that the device is authorized to use the one or more selectively activated features and one or more feature activation keys if the integrity information is acceptable. In some implementations, the processing circuit may still further be configured to receive periodic feature activation and usage status data from devices receiving feature activation authorizations from the authorization server, and enforce authorization agreements by controlling feature activation authorizations based on terms of the authorization agreements stored in the authorization server.

Another aspect of the disclosure provides a method that may be operational at a local authorization server. The method may include obtaining a request to activate one or more selectively activated features of a device. In an aspect, the method may include obtaining integrity information of the device, and sending the request to activate one or more selectively activated features and the integrity information to an authorization server. In some implementations, the method may further include obtaining authorization information indicating that the device is authorized to activate the one or more selectively activated features, wherein the authorization information includes one or more feature activation keys respectively corresponding to the one or more selectively activated features, and sending the authorization information and the one or more feature activation keys to the device.

In another aspect, there is described herein a local authorization server that includes a network communication circuit that may communicate with an authorization server and a processing circuit coupled to the network communication circuit. The processing circuit may be configured to obtain a request to activate one or more selectively activated features of a device. The processing circuit may further be configured to obtain integrity information of the device, and send the request to activate one or more selectively activated features and the integrity information to the authorization server. In some implementations, the processing circuit may be further configured to obtain authorization information indicating that the device is authorized to activate the one or more selectively activated features. In one example, the authorization information includes one or more feature activation keys respectively corresponding to the one or more selectively activated features. The processing circuit may be further configured to send the authorization information and the one or more feature activation keys to the device.

DRAWINGS

FIG. 4 illustrates an exemplary list of parameters and data that may be included in an exemplary authorization agreement between a first entity and a manufacturer or OEM of one or more devices in accordance with aspects described herein.

FIG. 5 illustrates an exemplary list of parameters and data that may be included in an exemplary authorization agreement between a manufacturer or OEM and another entity in accordance with aspects described herein.

DETAILED DESCRIPTION

Figure 1:
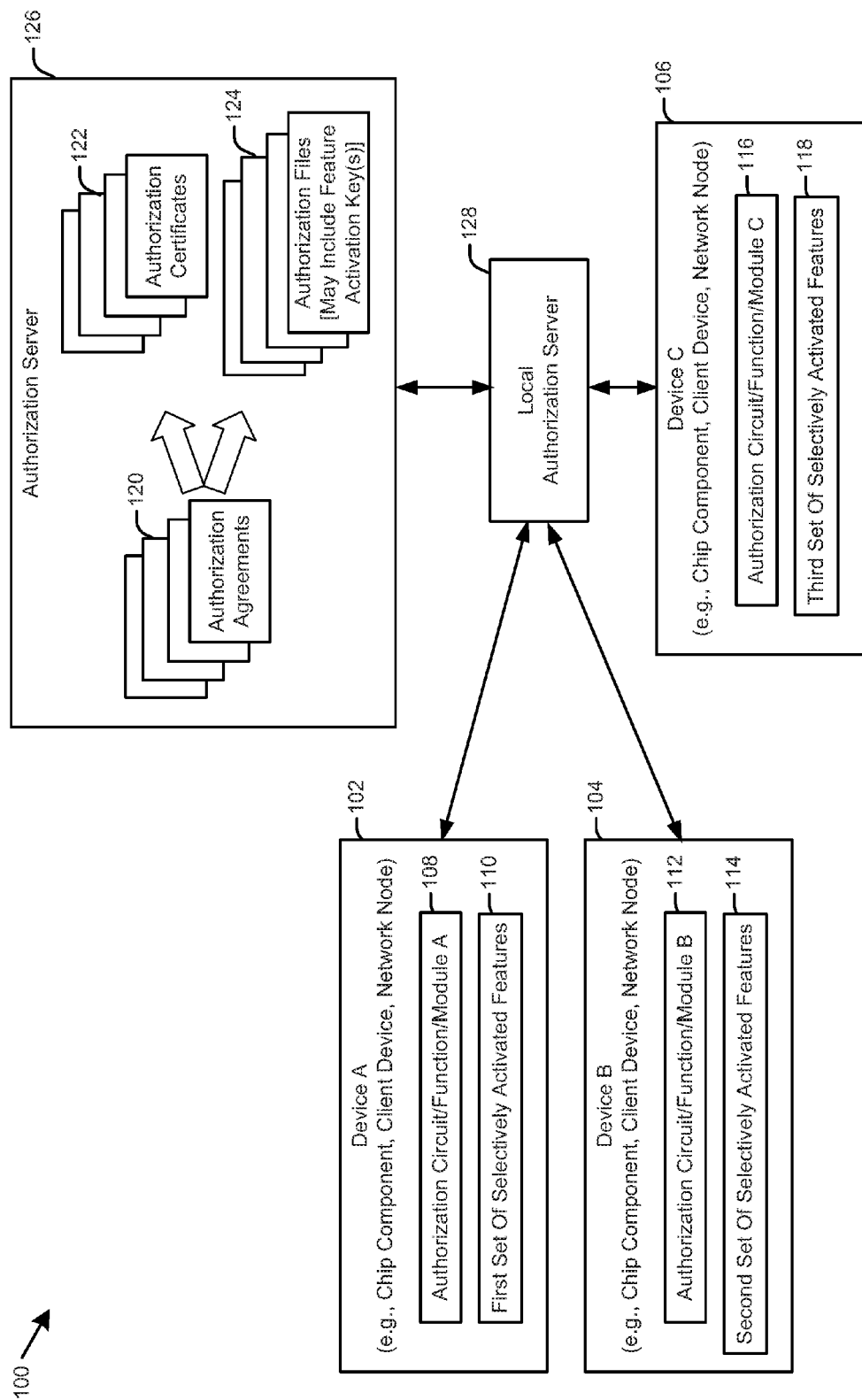
FIG. 1 is a block diagram of an exemplary system that may dynamically authorize and activate one or more selectively activated features on a set of one or more devices according to aspects described herein.

In the following description, reference is made to the accompanying drawings in which is shown, by way of illustration, specific aspects and features described in the disclosure. The aspects and features described in the disclosure are intended to be provided in sufficient detail to enable those skilled in the art to practice aspects of the disclosure. Other aspects and features may be utilized and changes may be made to that which is disclosed without departing from the scope of the disclosure. The following detailed description is not to be taken in a limiting sense and the scope of the aspects and features described and illustrated herein are defined only by the appended claims.

The term "exemplary" is used herein to mean "serving as an example, instance, or illustration." Any aspect or implementation described herein as "exemplary" is not necessarily to be construed as preferred or advantageous over other aspects or implementations.

The term "aspect" as used herein does not require that all aspects include the discussed aspect, or any discussed aspect, advantage, and/or mode of operation.

The term "obtain" is used herein to mean derive, generate, compute, request, receive, acquire, accept, procure, take, collect, get, take delivery or receipt of, be given, gain access to, come into possession of, etc. The term "obtain" as used herein encompasses obtaining locally, and/or obtaining from a non-local or remote entity.

The term "provision" is used herein to mean send, forward, provide, supply, to cause to be conveyed to a destination. The term "send" is used herein to mean provision, forward, provide, supply, to cause to be conveyed to a destination.

As used herein, the term "manufacturer" may refer to an entity that builds a product, and sells the product under the entity's own name to consumers or OEMs. An OEM may be an entity that purchases products from another entity and rebrands the products for sale under the OEM's name. An OEM may additionally or alternatively be an entity that purchases different types of products (e.g., servers and data storage products), from the same or different manufacturers, bundles the products together and sells the resulting bundled product under the OEM's name.

The term "device" may be used herein to refer to any communication device such as a chip component, a client device, and/or a network node. A "chip component" may include, for example, a processing circuit, a modem, a chip set. A "client device" may include, for example, a wireless device, mobile device, subscriber device, mobile phone, mobile communication device, mobile computing device, digital tablet, smart phone, user equipment (UE), user device, user terminal, terminal, station (STA). A "network node" may include any device or machine that is a functional node of a serving network or a home network. Examples of a network node include, but are not limited to, a base station, a network access node (e.g., an evolved node B (eNodeB, eNB)), a mobility management entity (MME), a gateway device (e.g., a serving gateway (S-GW), a packet data network gateway (P-GW)), a home subscriber server (HSS), an authorization, authentication, and accounting (AAA) server (collectively referred to as an HSS/AAA server), a wireless router, an access point (AP), and/or any node performing a network function. A client device and/or a network node may include a chip component.

The term "network access node" may be used herein to refer to any device that includes wireless device connectivity between a device (e.g., chip component, a client device) and a core network. Examples of a network access node may include an eNB, a base station, an AP. A network access node may be understood to be one example of a network node.

Networks external to a core network of a cellular communication system, such as a packet data network (PDN) (e.g., the Internet) and an IP Multimedia Service (IMS) network may be exemplified herein by reference to the PDN, however, nothing is intended to limit networks external to the core network to PDNs or IMS networks. Furthermore, aspects and features presented herein are exemplary. Nothing is intended to limit any aspect or feature presented herein to use in a cellular communication system.

As used herein, a reference to a "feature", including a reference to a "selectively activated feature", may be a reference to an aspect, circuit, service, or function of a device (e.g., chip component, client device, network node) that may be implemented in hardware, software, firmware, or any combination of two or more of hardware, software, and firmware.

The term "selectively activated" may describe a characteristic, or ability, of being changed in its state of activation (e.g., it may be activated and de-activated). In some aspects, the term "selectively activated" may describe a characteristic or ability, to be specifically enabled/disabled, turned-on/turned-off, and/or started/stopped (e.g., on command/demand). Accordingly, selectively activated features are, for example, features that are able to be specifically activated and/or de-activated (e.g., on command/demand).

As used herein, reference to a "network service" may be a reference to a function, capability, application, or portion thereof that is offered by or available through a network. A device (e.g., client device, chip component, network node) may include a set of selectively activated features to implement a network service.

As used herein, the term "authorization information" is understood to mean "proof of authority for a device to use a set of selectively activated features at the device" or "proof of authority for a network node to use a set of selectively activated features at the network node." Authorization information may be represented by, may include, or may identify an authorization agreement, an authorization certificate, or an authorization agreement and an authorization certificate. Alternatively or additionally, authorization information may include or identify a list of the set of selectively activated features derived by an authorization server (or local authorization server), from an authorization agreement stored at the authorization server (or local authorization server). As used herein, reference to a "feature activation key", "feature activation keys", or "feature activation key(s)" may be a reference to data (e.g., a sequence or string of bits) used to enable a given feature. The feature activation key may be related to and/or derived with a cryptographic function.

The term "up-to-date" may be used to denote or describe a thing that validly extends up to the present time. Thus, for example, an up-to-date license may be a license that is valid up to the present time.

As used herein, the term "match" may mean "equal to" or may mean "to correspond to" in some fundamental or basic respect.

Many communication devices (e.g., chip components, client devices, network nodes) offer multiple features. A manufacturer may activate a feature in a first model of a communication device and not activate the feature in a second model, even though both models include all hardware and software used to implement the feature. This may allow a manufacturer to charge more for the first model than for the second model. Manufacturers may implement some features as selectively activated features (e.g., features that possess an ability to be activated and/or de-activated (e.g., on command/demand)). Carrier aggregation is one example of a feature that might be implemented as a selectively activated feature. Carrier aggregation permits use of multiple carriers to increase transmission bandwidth. Carrier aggregation may improve communication device performance.

Aspects disclosed herein provide methods and apparatus for dynamically authorizing and activating one or more selectively activated features on a set of one or more communication devices. Dynamic authorization and activation of selectively activated features may be used, for example, to automatically activate and/or deactivate a service on a network such as a cellular communications network (e.g., 4G, Long Term Evolution (LTE), LTE-Advanced LTE-A), and/or future implementations such as 5G).

Overview

A device (e.g., chip component, client device, network node) may include an authorization circuit/function/module that activates, deactivates, and/or reports-on one or more selectively activated features of the device. The authorization circuit/function/module may additionally verify that the device has authority to activate and/or use/provide a given feature. The given feature may be used to enable the device to employ a given service (e.g., network service). In some aspects, verification may be by validation of authorization information. The authorization circuit/function/module may be useful in a system where, for example, services and/or device features can be individually enabled via licenses in real time.

In one aspect, using a client device as an example, the client device may determine that a service (e.g., a network service) is available from a network access node (e.g., CNB). The client device may determine which selectively activated feature(s) (from among a plurality of features available to the client device) the client device needs to use the service. The client device may further determine whether the client device presently has authorization to activate and/or use the determined feature(s). If the client device determines that the client device presently has authorization to activate and/or use the determined feature(s), the client device may activate and/or use the determined feature(s). The client device may activate feature(s) (including hardware/software/firmware features) using one or more feature activation keys obtained by the authorization circuit/function/module. If the client device determines that the client device does not presently have authorization to activate and/or use all of the determined features, the client device may send a feature activation request (e.g., a request to activate one or more features, a request for authorization to activate one or more features) to a local authorization server.

In one aspect, if the local authorization server possesses authorization information related to the device (e.g., proof that the device is authorized to activate the selectively activated feature(s) identified in the feature activation request), the local authorization server may send the authorization information and an authorization file to the client device. The authorization information may be in the form of an authorization agreement and/or an authorization certificate. The authorization file may include a proof that its content is approved/authenticated by the authorization server so that the device can verify the file before activating the feature.

In one aspect, the authorization file may include one or more feature activation keys associated with the one or more selectively activated features identified in the feature activation request. The authorization file may also include authorization parameters (e.g., date upon which authorization to use a given feature expires or is revoked, geographic and/or time related data identifying where and/or when the feature activation keys are valid). The client device may activate feature(s) identified in the feature activation request using the one or more feature activation keys thus obtained.

If the local authorization server does not possesses authorization information related to the device, the local authorization server may send (e.g., forward) the feature activation request to an authorization server.

In one aspect, the authorization server may verify the right of the client device to activate a selectively activated feature that is a subject of the feature activation request. Verification may include evaluation of and/or validation of an authorization agreement stored at the authorization server. If the authorization server verifies the right of the client device to activate the feature, the authorization server may send authorization information and/or an authorization file including authorization parameters and/or one or more feature activation keys to the local authorization server. The local authorization server may send (e.g., forward) the authorization information and/or the authorization file including authorization parameters and/or one or more feature activation keys to the client device. The client device may activate feature(s) identified in the feature activation request using the one or more feature activation keys thus obtained.

Exemplary System and System Description

FIG. 1 is a block diagram of an exemplary system 100 that may dynamically authorize and activate one or more selectively activated features on a set of one or more devices (e.g., chip components, client devices, network nodes) according to aspects described herein. The set of one or more devices is exemplified in FIG. 1 with Device A 102, Device B 104, and Device C 106. Device A 102, Device B 104, and Device C 106 may each include an authorization circuit/function/module 108, 112, 116. The authorization circuit/function/module 108, 112, 116 may be useful in a system where, for example, services (e.g., network services) can be implemented in whole or in part using device features (e.g., selectively activated features) that can be individually activated/deactivated (e.g., enabled/disabled) according to, for example, terms of licenses, in real time. An authorization circuit/function/module 108, 112, 116 may be included with any device such as Device A 102, Device B 104, or Device C 106 that includes a selectively activated feature, where authorization to activate the selectively activated feature can be based, for example, on an authorization agreement 120. The authorization agreement 120 may therefore be a source for proof of a right to activate the selectively activated feature.

Device A 102 includes authorization circuit/function/module A 108 and a first set of selectively activated features 110. Device B 104 includes authorization circuit/function/module B 112 and a second set of selectively activated features 114. Device C 106 includes authorization circuit/function/module C 116 and a third set of selectively activated features 118. For ease of reference, and without any limiting intent, authorization circuit/function/module A 108, authorization circuit/function/module B 112, and authorization circuit/function/module C 116 may be referred to, individually and/or collectively, as "authorization function 108, 112, 116" herein. Additionally, for ease of reference, and without any limiting intent, Device A 102, Device B 104, and Device C 106 may be referred to, individually and/or collectively, as "device 102, 104, 106" herein.

Authorization to activate one or more selectively activated features in a set of selectively activated features (such as the first set of selectively activated features 110, the second set of selectively activated features 114, and/or the third set of selectively activated features 118) at a given device (such as Device A 102, Device B 104, and/or Device C 106) may be a prerequisite to activation of the one or more features at the given device.

In some aspects described herein, an authorization function 108, 112, 116 of a device 102, 104, 106 may obtain and verify proof that the device 102, 104, 106 was authorized to activate a selectively activated feature by an authorization server 126 and to obtain and verify the proof (e.g., authorization information) before the device 102, 104, 106 activates the selectively activated feature. In some implementations, the authorization function 108, 112, 116 at a first device may also send the proof to a second device, where the second device may provide a service (e.g., a network service) to the first device.

Examples of network services may include, for example, dual connectivity service, multiple subscription service, device-to-device (D2D) mode service, multimedia broadcast/multicast service (MBMS), and/or an unlicensed operation service. A dual connectivity service may, for example, provide connectivity both within a radio access technology (RAT) (e.g., 4G) and across RATs (e.g., across 4G and 5G and/or wireless local area network (WLAN)).

A multiple subscription service may provide, for example, services to a device using a single radio link to serve multiple subscriptions simultaneously (e.g., an operator service subscription and a streaming video subscription and/or an online retail sales provider subscription simultaneously).

A D2D mode service may offer, for example, a service providing proximal discovery of services, friends, and offers. A D2D service maybe offered, for example, in addition to a traditional access service.

An MBMS service may be a service that facilitates a device to receive multicast services in addition to access to unicast services.

An unlicensed operation service may be, for example, a service that allows a device to use licensed assisted access or operate in an unlicensed band using LTE or 5G or one or more other RATs. A complete list of features (e.g., selectively activated features) that may need to be activated to use the above-listed exemplary services, as well as other services, is beyond the scope of this application. Nevertheless, some examples of features that may be selectively activated may include: carrier aggregation; certain physical channels (e.g., in the case of dual connectivity, D2D, and/or unlicensed operation services); selectively activated hardware; and/or selectively executed portions of processing circuit readable instructions stored on the device that were otherwise left unexecuted to preclude a given selectively activated feature from activation.

Providing the proof (e.g., authorization information) to the second device may be a prerequisite before the second device provides the service. Therefore, for example, even after the first set of selectively activated features 110 is authorized and activated at Device A 102, another device (e.g., Device C 106) (e.g., a network access node) may request Device A 102 to send proof of authority of Device A 102 to use the first set of selectively activated features 110 at Device A 102, where the proof of authority can be signed by the authorization server 126. Still further, in some implementations, before Device A 102 uses (e.g., activates, employs) a service (e.g., a network service) offered by Device C 106 (where a third set of selectively activated features includes third selectively activated features needed by Device C 106 to provide the service to Device A 102), and even after the third set of selectively activated features 118 are authorized and activated at Device C 106 (e.g., a network access node), Device A 102 (e.g., a client device) may request Device C 106 to send proof of authority of Device C 106 to use the third set of selectively activated features 118 at Device C 106, where the proof of authority can be signed by the authorization server 126 (or another authorization server).

Device A 102 may send the request for proof to Device C 106 before using the service offered at Device C 106. Device A 102 may obtain and verify the proof obtained from Device C 106 before using the service offered at Device C 106.

Authorization information (e.g., proof of authority for the device to use a set of selectively activated features at the device) may be based on an authorization agreement 120. Authorization information may be provided, for example, in the form of the authorization agreement 120 and/or an authorization certificate 122. The authorization agreement 120 may be stored at an authorization server 126. The authorization server 126 may derive an authorization certificate 122 and an authorization file 124 (which may including feature activation keys) based on the authorization agreement 120. The authorization certificate 122 may include, for example, the device 102, 104, 106 public key, the selectively activated features authorized to the device 102, 104, 106 (e.g., a set of selectively activated features), and an identifier (e.g., a hash of the device public key or some other device unique identifier) of the device 102, 104, 106 to which the selectively activated features are authorized. The authorization certificate 122 may also include, for example, the expiration time of the authorization certificate 122 and may additionally or alternatively include parameters related to the selectively activated features authorized to the device 102, 104, 106. The authorization certificate may be signed by the authorization server 126 using a private key of the authorization server 126.

Accordingly, the authorization certificate 122 carries the signature of the authorization server 126; the signature can be verified using the public key of the authorization server 126. To derive the signature, for example, the authorization server 126 may apply the device 102, 104, 106 public key, the selectively activated features authorized to the device 102, 104, 106, and the identifier of the device 102, 104, 106 to a hash function; the authorization server 126 may then input the derived hash value and the private key of the authorization server 126 to a signature function. A verification function may be an inverse of the signature function; an entity (e.g., network node) may verify the signature by inputting the signature and the public key of the authorization server 126 to the verification function. In this way, the authorization certificate 122 may be verified and may be used as proof of authority for the device 102, 104, 106 to use a set of selectively activated features at the device 102, 104, 106, when the authorization certificate 122 is signed by the authorization server 126. Accordingly, the authorization certificate 122 may be used as authorization information.

In essence, devices 102, 104, 106 are provisioned with the authorization server's certificate during the feature activation. The authorization certificate 122 may also serve to prove that the authorization server 126 issued an authorization file 124 to the device 102, 104, 106 identified in the authorization file 124.

It is noted that when the device 102, 104, 106 sends the authorization certificate 122 to an entity (e.g., a network node), the device 102, 104, 106 may sign the authorization certificate 122 with a private key of the device 102, 104, 106. This facilitates an ability of the device 102, 104, 106 to prove that the device 102, 104, 106 is the owner of the public key that is included in the authorization certificate 122. Using the public key included in the authorization certificate 122, the entity (e.g., the network node) can verify that the device that sent the authorization certificate 12 is the same device identified by the authorization server 126 in the authorization certificate 122.

The authorization information may be requested by a device 102, 104, 106 at any time (e.g., during initial attach service request, handover, on demand).

An authorization function 108, 112, 116 may activate a given selectively activated feature (or may authorize/command/instruct the device 102, 104, 106 hosting the authorization function 108, 112, 116 to activate the given selectively activated feature) if the authorization function 108, 112, 116 obtains and verifies an authorization agreement 120, or an authorization certificate 122 derived from the authorization agreement 120. The authorization agreement 120, as well as the authorization certificate 122, can record a right of the device 102, 104, 106 to activate the given selectively activated feature.

An authorization function 108, 112, 116 may send a feature activation request (e.g., a request to activate one or more selectively activated features, a request for authorization to activate one or more selectively activated features) to a local authorization server 128. The response to the feature activation request may include authorization information (e.g., proof of authority for the device 102, 104, 106 to use a set of selectively activated features, including the one or more selectively activated features identified in the feature activation request, at the device). The response may also include an authorization file 124. The authorization file 124 may include one or more feature activation key(s). The authorization server 126 may encrypt the authorization information, authorization file, and or the one or more feature activation keys.

The authorization server 126 may sign the authorization information with a private key of a public/private key pair belonging to the authorization server 126. In a case where the authorization in comprises an authorization certificate, the authorization server 126, for example, may sign the authorization certificate with the private key of the public/private key pair belonging to the authorization server 126. The device 102, 104, 106 may use a public key of the authorization server 126 to verify that the authorization certificate 122 is authentic. Persons skilled in the art will appreciate that alternative ways to sign items such as an authorization certificate 122 are within the scope of the aspects presented herein.

The authorization server 126 may encrypt the authorization file 124 that may include one or more feature activation keys using the public key of a public/private key pair belonging to the device 102, 104, 106. In some aspects, only the authorization function 108, 112, 116 has access to the private key of the public/private key pair belonging to the device 102, 104, 106; therefore only the authorization function 108, 112, 116 can decrypt the authorization file 124 that may include one or more feature activation keys. Persons skilled in the art will appreciate that other types of encryption for items such as an authorization file 124 that may include feature activation keys are within the scope of the aspects presented herein.

The local authorization server 128 may send the feature activation request to the authorization server 126. In some aspects, the feature activation request can be sent directly from the authorization function 108, 112, 116 to the authorization server 126 without first being sent to the local authorization server 128.

The authorization server 126 can send a response to the feature activation request after considering/evaluating/processing the authorization agreement 120 associated with the device such as Device A 102, Device B 104, or Device C 106. The response to the feature activation request may include authorization information that may be used to verify the right of the device 102, 104, 106 to activate the one or more selectively activated features identified in the feature activation request.

The response may also include an authorization file 124. The authorization file 124 may include one or more feature activation key(s), authorization parameters, or one or more feature activation key(s) and authorization parameters. Authorization parameters may include, for example, the expiration date/revocation date of the authorization. The local authorization server 128, or in some aspects the authorization server 126, may forward the authorization certificate 122 and the authorization file 124 including the feature activation key(s) and authorization parameters, to the authorization function 108, 112, 116.

As indicated above, to activate a selectively activated feature of a device 102, 104, 106 the selectively activated feature may need to be authorized. In accordance with one non-limiting example, an entity (e.g., a user, a service provider, OEM, manufacturer) may pay an authorization fee (e.g., a licensing fee) to activate the selectively activated feature to a licensing service based on terms defined in an authorization agreement 120. Before or after the payment is verified, the authorization agreement 120 may be uploaded to the authorization server 126 and/or a local authorization server 128. The authorization server 126 may be hosted by the licensing service. The authorization server 126 (e.g., a licensing server) may be used for validation, activation, and/or enforcement of the authorization agreement and/or selectively activated features associated therewith.

In one aspect, a device 102, 104 may determine that a network service is available. The device 102, 104 may identify selectively activated features that are available to the device (but not necessarily activated at the device) and that are needed to use the network service. Identification of selectively activated features needed to use the network service may be obtained from any suitable source such as, for example, a listing/table stored in the device 102, 104, a listing/table obtained from a local authorization server 128, a listing/table obtained from an authorization server 126, or may be obtained from a remote network node or other source (e.g., a node on a packet data network). The device 102, 104 may determine if it (i.e., the device 102, 104) is authorized to activate the selectively activated features that are needed to use the network service.

If the device 102, 104 is not authorized to activate all of the selectively activated features needed to use the network service, the device 102, 104, or authorization function 108, 112 of the device 102, 104, may request authorization to activate a selectively activated feature (or a plurality of selectively activated features). The device 102, 104, or authorization function 108, 112 of the device 102, 104, may request proof that the device 102, 104 is authorized to activate the requested selectively activated feature. Activation of the requested selectively activated feature may enable the device 102, 104, for example, to obtain a service offered on an application server or use a service provided by a network access node (e.g., eNB).

Exemplary Operating Environ

Figure 2:
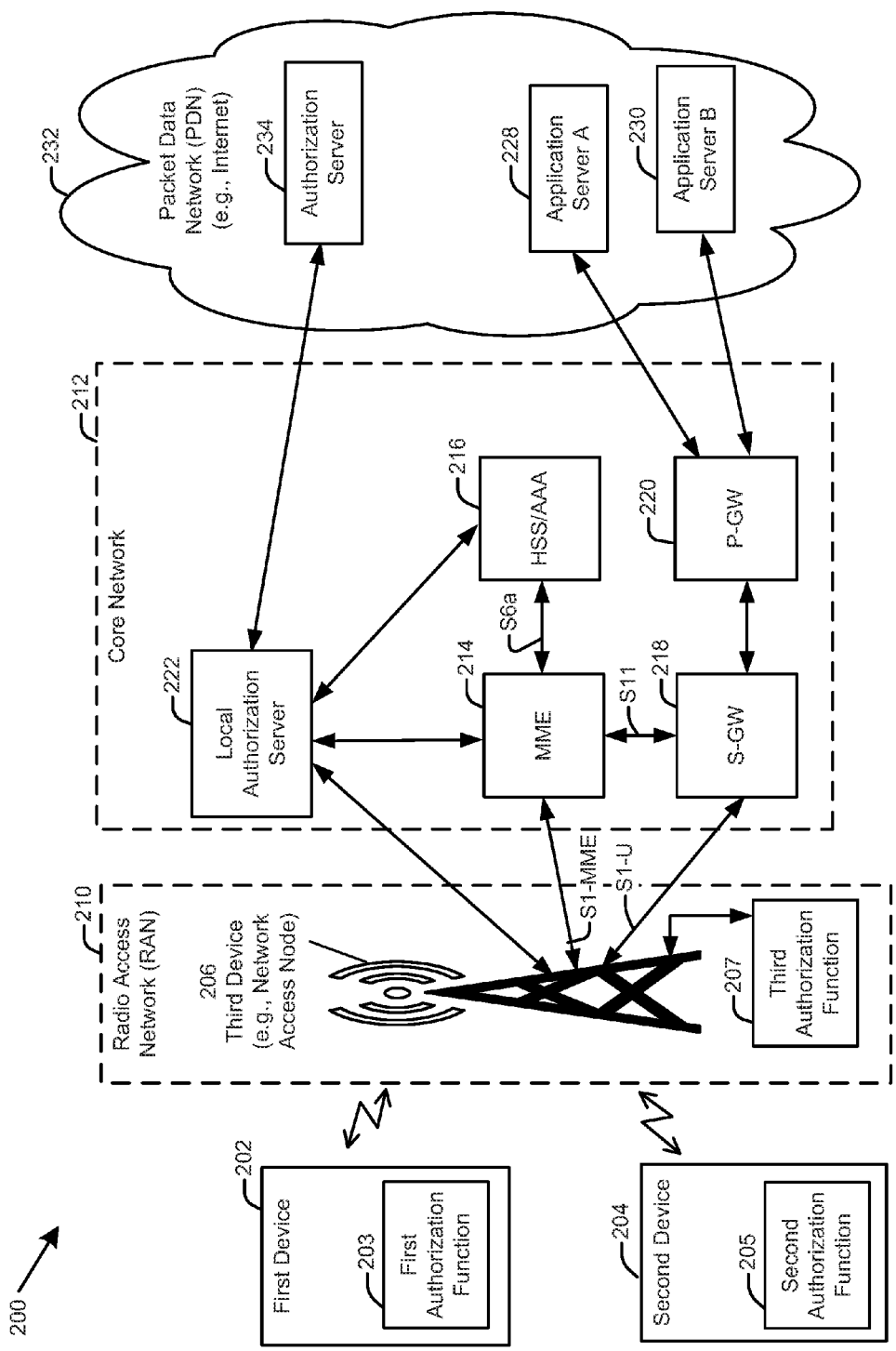
FIG. 2 illustrates an exemplary operating environment according to aspects described herein.

FIG. 2 illustrates an exemplary operating environment 200 according to aspects described herein. For ease of reference, and without any limiting intent, each authorization circuit/function/module will be referred to as an "authorization function" herein. In the exemplary operating environment 200, a first device 202 (e.g., chip component, client device, network node) includes a first authorization function 203. A second device 204 (e.g., chip component, client device, network node) includes a second authorization function 205. The first device 202 and the second device 204 may wirelessly communicate with a third device 206, depicted as a network access node (e.g., eNodeB). The third device 206 (e.g., network access node) may include a third authorization function 207.

The first device 202 may include one or more selectively activated features needed to use a first network service. The second device 204 may include one or more selectively activated features needed to use a second network service. The third device 206 may include one or more selectively activated features needed to use/provide the first network service to the first device 202 and/or the second network service to the second device 204.

The third device 206 (e.g., network access node) may be part of a radio access network (RAN) 210 (e.g., enhanced universal terrestrial radio access network (E-UTRAN)). In a non-limiting example of a cellular communication system (e.g., 4G, LTE, LTE-A, 5G) the RAN 210 may communicate control signaling and data traffic to a core network 212 (e.g., evolved packet core (EPC)). A network operator (e.g., a mobile network operator (MNO)) may operate the core network 212. Control signaling may be communicated via an S1-MME reference point. Data traffic may be communicated via an S1-U reference point.

The core network 212 may include a mobility management entity (MME) 214, a home subscriber server/authorization, authentication, and accounting server (HSS/AAA) 216, a serving gateway device (S-GW) 218, and a packet data network gateway device (P-GW) 220. In addition to the components identified above, the core network 212 may also include a local authorization server 222. The local authorization server 222 may communicate with the third device 206 (e.g., network access node) in the RAN 210 as well as other network access nodes (not shown). The local authorization server 222 may communicate with the first device 202 and the second device 204 via the third device 206 (e.g., network access node). Internal to the core network 212, the local authorization server 222 may communicate with the MME 214, and/or the HSS/AAA 216. The local authorization server 222 may serve as a proxy of the authorization server 234 to the first device 202, the second device 204, and the third device 206 (e.g., network access node) coupled to the core network 212 associated with the local authorization server 222.

The P-GW 220 may communicate with application servers 228, 230 on a packet data network (PDN) 232 (e.g., the Internet). The application servers 228, 230 may be associated with service providers such as, for example, a retail sales provider, an Internet search engine provider, an entertainment provider, and a social media service provider. The application servers 228, 230 may host applications and/or application services associated with the service providers.

The local authorization server 222 in the core network 212 may communicate with an authorization server 234 in the packet data network 232. It will be understood that the authorization server 234 could be located anywhere. In other words, it is optional to locate the authorization server 234 with the application servers 228, 230 on the packet data network 232. For example, a core network 212 may include the authorization server 234 in addition to the local authorization server 222.

The authorization server 234 may be accessed by the first device 202, the second device 204, the third device 206, as well as by any number of entities, such as radio access network providers, mobile network operators, or access point providers. Each entity may also maintain its own local authorization server. Aspects of authorization servers and local authorization servers will be provided below.

Architecture Reference Model

Figure 3:
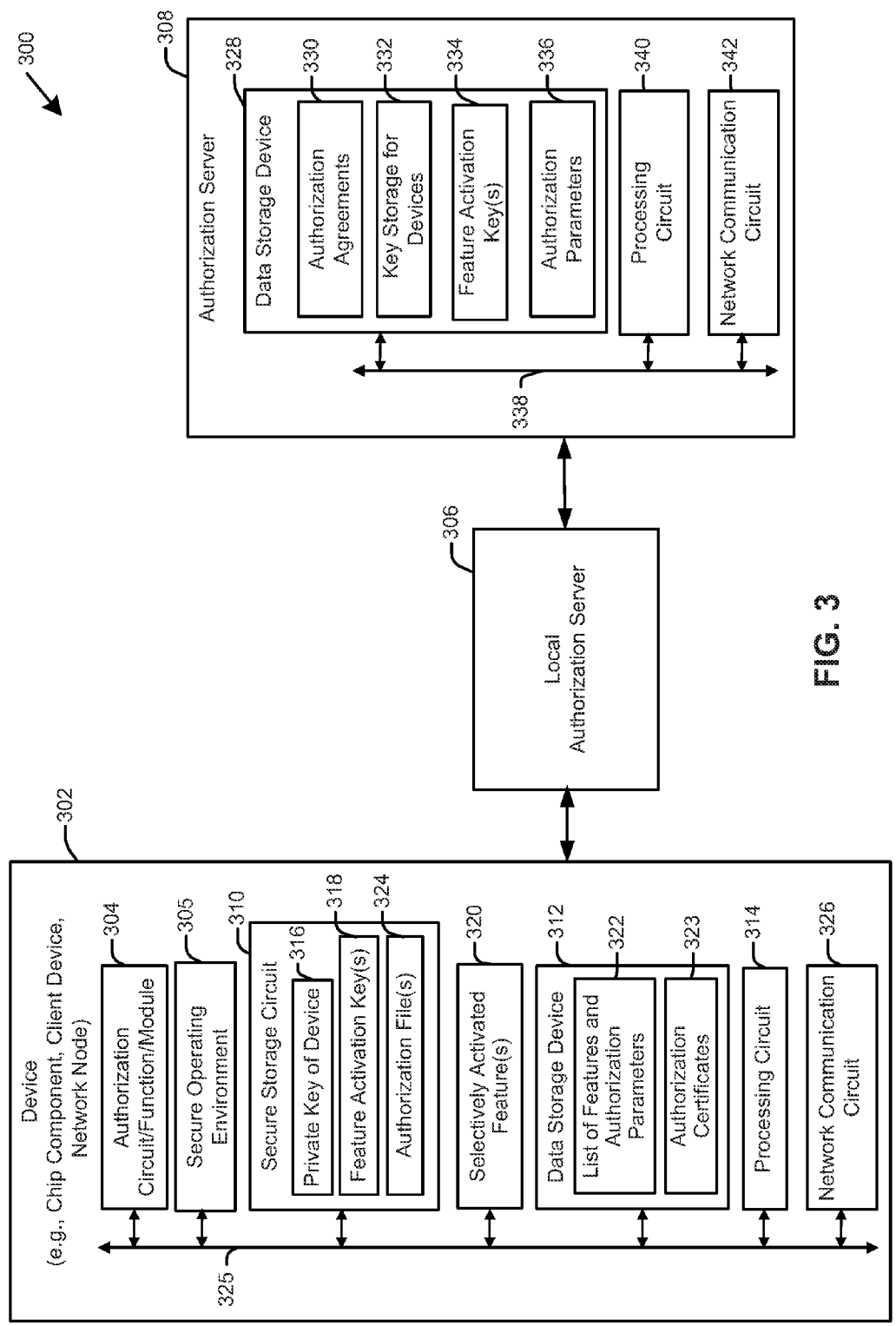
FIG. 3 is an architecture reference model of a system according to aspects described herein.

FIG. 3 is an architecture reference model of a system 300 according to aspects described herein. FIG. 3 illustrates a device 302 (e.g., chip component, client device, network node), a local authorization server 306, and an authorization server 308. The device 302 may include a least one selectively activated feature 320. The right of the device 302 to activate the selectively activated feature 320 may be based on an authorization agreement 330 (e.g., contract, agreement, license). In an aspect, the right of the device 302 to activate the selectively activated feature 320 may be based on validation of the authorization agreement 330 (or authorization information derived from the authorization agreement 330). In an aspect, the right of the device 302 to activate the selectively activated feature 320 may be based on a payment related to that selectively activated feature 320. In an aspect, a status of the payment related to the selectively activated feature 320 may be reflected in the authorization agreement 330 (or authorization information derived front the authorization agreement 330). In an implementation, the authorization server 308 may find utility at various instances in connection with a selectively activated feature 320, including, for example, during validation (e.g., of a right use the selectively activated feature 320), activation (e.g., of the selectively activated feature 320), and enforcement (e.g., of terms of the authorization agreement 330 related to the selectively activated feature 320).

The device 302 may be coupled to a local authorization server 306. The local authorization server 306 may be coupled to an authorization server 308. The device 302, local authorization server 306, and authorization server 308 will now be described.

The device 302 may include an authorization circuit/function/module, which for ease of reference, and without any limiting intent, will be referred to as the "authorization function 304" herein.

The authorization function 304 may implement a secure process (e.g., perform secure processing) at a processing circuit 314 of the device 302 and/or at a secure operating environment 305 of the device 302. As used herein, the term "secure" may mean protected or safe from access by other processes including external and internal processes and/or from a user. In one aspect, a secure operating environment 305, and/or the secure process implemented therein, may be inaccessible to a user and/or inaccessible to processes other than the secure process implemented by the authorization function 304. In one aspect, where the authorization function 304 implements the secure process at the processing circuit 314 of the device 302, the secure process may be inaccessible to a user and/or inaccessible to processes other than the secure process implemented by the authorization function 304.

The authorization function 304 may implement a process to verify that the device 302 is authorized to activate the selectively activated feature 320 of the device 302. The process may be a secure process. In one aspect, to verify that the device 302 is authorized to activate the selectively activated feature 320, the authorization function 304 may obtain proof (e.g., authorization information) that the selectively activated feature 320 is authorized to be activated. The selectively activated feature 320 may be authorized to be activated for initial, repeated, and/or continued use. Verification may be by way of validating the obtained proof.

The authorization function 304 may also implement a process to verify that a network node (e.g., eNB, MME, S-GW, associated with a network to which the device 302 is attached, or plans to attach, is authorized to activate a feature corresponding to the selectively activated feature 320. The process may be a secure process. The feature corresponding to the selectively activated feature 320 at the network node may be used to facilitate a service offered by the network via the network node. By way of example, the device 302 may need the feature corresponding to the selectively activated feature 320 to be activated at the network node to use a network service provided at the network node. By way of additional example, the device 302 may need the feature corresponding to the selectively activated feature 320 to be activated at the network node to realize improved service that can be achieved by activating the selectively activated feature 320 at the device 302. For example, a device 302, which for the purposes of this example may be a client device, may be manufactured to implement carrier aggregation upon activation of the selectively activated feature 320. Carrier aggregation permits use of multiple carriers to increase transmission bandwidth. Carrier aggregation may improve the performance of the device 302. The device 302 may be authorized to activate the selectively activated feature 320 and may be authorized to configure itself to use carrier aggregation. However, to be effective, a network access node (e.g., eNB) coupled to the device 302 should also activate a corresponding feature such that the network access node is configured to use carrier aggregation. Therefore, in some aspects, a selectively activated feature 320 may be jointly activated and used by two devices (e.g., chip components, client devices, network nodes, or any combination of two or more thereof).

In an example, the authorization function 304 may activate and/or deactivate the selectively activated feature 320 in accordance with terms defined in the authorization agreement 330 (and reflected in authorization information derived from the authorization agreement 330 and obtained at the authorization function 304). In the example, the terms upon which activation and use are acceptable may be defined by, or listed in, the authorization agreement 330. In the example, the terms may include payment in exchange for a right to use the selectively activated feature 320. In an implementation, the authorization function 304 of the device 302 may find utility at various instances in connection with the selectively activated feature 320 associated with the device 302, including, for example, during validation (e.g., of a right to use the selectively activated feature 320), activation (e.g., of the selectively activated feature 320), and enforcement (e.g., of terms of the authorization agreement 330 related to the selectively activated feature 320). In some aspects, activation of the selectively activated feature 320 could allow the device 302 to obtain services from, for example, an application server on a network (e.g., the Internet) via another device (such as an eNB).

The device 302 may also include a secure storage circuit 310 (e.g., a circuit/function/module). In one aspect, the secure storage circuit 310 may be considered secure based on an ability of components/entities (internal and/or external to the device 302) to read and write data from and to the secure storage circuit 310. In one aspect, the secure storage circuit 310 may be permanently incorporated into, or integrated with, the device 302. For example, the secure storage circuit 310 may comprise a non-volatile memory array fabricated on the same substrate as a processing circuit 314 included with the device 302.

Within the secure storage circuit 310 there may be storage space for a private key 316 of a private/public key pair derived for the device 302. In one aspect, a manufacturer or OEM may generate the private/public key pair. In another aspect, another entity may generate the private/public key pair. The private key 316 of the private/public key pair may be stored in the secure storage circuit 310 by the manufacturer, OEM, or by another entity. In one aspect, the private key 316 may be stored in the secure storage circuit 310 before transfer of ownership of the device 302 from the manufacturer or OEM to a third entity. In other aspects, the private key 316 may be stored in the secure storage circuit 310 at any time and by any entity. In some aspects, the private key 316 is only known to the device 302. In some aspects, the private key 316 is only known to the authorization function 304 of the device 302.

The private key 316 may be used by the device 302 (or the authorization function 304) to decrypt feature activation keys 318 and/or authorization files that may include feature activation keys 318. The feature activation keys 318 and/or authorization files that may include feature activation keys 318 may be signed/encrypted by a third entity (e.g., the authorization server 308) using the public key of the device 302 prior to sending the feature activation keys 318 to the device 302.

In an aspect, a feature activation key 318 may be used to activate a selectively activated feature 320 of the device 302. In aspects described herein, feature activation keys 318 may be stored in an encrypted form. In some examples, feature activation keys 318 may only be decrypted by the authorization function 304 (e.g., using the private key 316 of the device 302). In some examples, feature activation keys 318 may be stored in a secure environment, such as the secure storage circuit 310.

The device 302 may further include a data storage device 312 (e.g., a circuit/function/module), which may be separate from the secure storage circuit 310. In one aspect, the secure storage circuit 310 could be a partition of the data storage device 312, or vice versa. The secure storage circuit 310 and/or data storage device 312 may comprise, for example, a hard disk, a partition of a hard disk, an optical disk, a partition of an optical disk, a solid state memory, or a partition on a solid state memory.

Within the data storage device 312, there may be stored a list of features and authorization parameters 322. For example, the list of features and authorization parameters 322 may identify the selectively activated feature 320 that the device 302 has authority to activate/deactivate, and their associated authorization parameters. The list of features and authorization parameters 322 may be compiled from, for example, one or more authorization files signed by the authorization server (where signing may be used to validate the authorization files). The authorization files may be obtained from the local authorization server 306 or the authorization server 308, for example, upon device activation, device handover, device update, or in response to a request from the device 302. The authorization parameters, in the list of features and authorization parameters 322, may indicate, for example, whether the selectively activated feature 320 is activated or deactivated and a date upon which authority of the device 302 to use selectively activated feature 320 expires or is revoked. As used herein, authority of the device 302 to use a selectively activated feature 320 encompasses authority of the device 302 to provide the selectively activated feature 320.

Within the data storage device 312, there may also be stored authorization certificates 323. In an aspect, authorization certificates 323 may be verified by any entity and therefore need not be stored in a secure storage. On the other hand, authorization file(s) 324 includes private information such as feature activation keys. Therefore, in an aspect, authorization file(s) 324 may be stored in the secure storage circuit 310.

The device 302 may also include a communications bus 325 to provide for communications between the authorization function 304, the secure operating environment 305, the secure storage circuit 310, the data storage device 312, the processing circuit 314, and/or a network communication circuit 326 included with the device 302. The network communication circuit 326 may also provide for communication with the local authorization server 306 and/or the authorization server 308.

In some aspects, the local authorization server 306 may act as a local proxy to the authorization server 308. In some aspects, the local authorization server 306 may send proof of authority for the device 302 to use a set of selectively activated features 320 at the device 302, signed by the local authorization server 306, where the device 302 may be coupled to the core network associated with the local authorization server 306. In some aspects, the local authorization server 306 may temporarily operate independently of the authorization server 308. Whether the local authorization server 306 acts as a local proxy to the authorization server 308 or a local server per se may be, for example, a function of the terms of the authorization agreement 330 stored at the authorization server 308.

The authorization server 308 may include a data storage device 328 (e.g., a circuit/function/module). The data storage device 328 may store a listing, repository, or record of authorization agreements 330 (e.g., agreements, contracts, licenses). The authorization agreements 330 may relate to various selectively activated features of a plurality of devices. The data storage device 328 may maintain key storage 332 for devices that are covered by authorization agreements 110. The key storage 332 may include private keys and/or public keys that may be used to encrypt messages sent to devices (such as device 302) that are covered by authorization agreements 330.

The data storage device 328 of the authorization serve 308 also include feature activation key(s) 334 that may be used to activate the selectively activated feature(s) 320 of the device 302. In some aspects, feature activation key(s) 334 can be sent from an authorization server 308 (or a local authorization server 306) to the device 302 when the authorization function 304 of the device 302 requests proof that the device 302 has authority to activate one or more of the selectively activated feature(s) 320. In such aspects, the selectively activated feature(s) 320 may be activated by (or on authority of) the authorization function 304, after the authorization server 308 (or the local authorization server 306) sends proof (e.g., authorization information) to the authorization function 304 that the device 302 has authority to activate the selectively activated feature(s) 320.

In an example, the data storage device 328 of the authorization server 308 may store a listing, repository, or record of authorization parameters 336 for each selectively activated feature 320 at the device 302 as a function of a device model number. In one aspect, to permit differentiation of individual devices having the same model number, for example, the data storage device 328 may store the authorization parameters 336 for each selectively activated feature 320 as a function of a device serial number, or other device identifier such as an International Mobile Station Equipment Identity (IMEI). As known to those of skill in the art, the IMEI is a unique number that is used to identify hardware in accordance with Third Generation Partnership Project (3GPP systems (e.g., GSM, UNITS, LTE, LTE-A).

The authorization server 308 may also include a communications bus 338 to provide for communications between the data storage device 328, a processing circuit 340, and/or network communication circuit 342 included with the authorization server 308. The network communication circuit 342 may also provide for communication with the local authorization server 306 and/or the device 302.

As indicated above, the local authorization server 306 may serve as a proxy for the authorization server 308. As such, the local authorization server 306 includes the same or similar circuits/functions/modules as that of the authorization server 308. The description and illustration of the same or similar circuits/functions/modules will therefore be omitted.

Authorization Agreements

Returning to FIG. 1, authority of a device 102, 104, 106 to use a set of selectively activated features 110, 114, 118 may be given in an authorization agreement 120 (e.g., agreement, contract, license). In some aspects, the authorization agreement 120 may be considered a license. As used herein, in an aspect, a reference to a set of selectively activated features, or a reference to selectively activated feature(s), may be understood to be a reference to one selectively activated feature (e.g., where the set includes one selectively activated feature or the set includes one or more distinct selectively activated features). The authorization agreement 120 may be used as proof, or the authorization agreement 120 may be used to derive proof, of authority of a device 102, 104, 106 to use (e.g., activate, maintain activation of) a set of selectively activated features 110, 114, 118 at the device 102, 104, 106.

The authorization agreement 120 may be established between two or more entities. The entities to an authorization agreement 120 may, for example, claim rights to the device, a feature of the device, and/or a service to be used by the device. By way of example, an authorization agreement 120 may established between a manufacturer, vendor/OEM, the device purchaser, re-seller, licensing service, and/or any two or more of the manufacturer, vendor/OEM, the device purchaser, re-seller, or licensing service. The device purchaser may be an end user, a reseller, or an entity that will lease the device. A licensing service may be an organization that grants licenses and monitors compliance with licensing terms.

In an example, the authorization agreement 120 may be established in advance of a time when an authorization function 108, 112, 116 seeks to obtain proof of the authorization agreement 120. In another example, the authorization agreement may be established at the same time, or substantially the same time, as when an authorization function 108, 112, 116 seeks to obtain proof of the authorization agreement 120.

The authorization agreement 120 may be referred to as a writing. As used herein, a writing includes all non-transient machine readable expressions of authorization agreements, regardless of whether such authorization agreements ever existed in a physical human-readable form. The term "writing" includes any human-readable document reduced to any form that can be read by a machine. Forms that can be read by a machine may include electrical, optical, magnetic, or other storage forms known to those of skill in the art.

In one example, the authorization agreement may be used to derive an authorization certificate that includes:

1. a set of selectively activated features authorized for use;
2. lifetime/expiration time;
3. location where the selectively activated features are enabled (including, for example, geographic or network identifiers such as PLMN, SSIDs, or cell IDSs);
4. maximum number of network access nodes that can use the selectively activated features; and
5. periodic usage reporting requirements.

FIG. 4 illustrates an exemplary list 400 of parameters and data that may be included an exemplary authorization agreement between a first entity (e.g., an owner of a device, seller/re-seller of the device, service provider that offers the device to customers with or without a discount) and a manufacturer or OEM of one or more devices in accordance with aspects described herein. The listing is presented in tabular form in FIG. 4, however, any machine readable (e.g., processing circuit readable) form is acceptable according to this aspect. The listing includes parameters, such as the date of an agreement 402, an identifier of an owner 404 of the device, an identifier of the manufacturer or OEM 406 of the device, an identifier of the device 408 (e.g., an IMEI number), a list of authorized features 410, the duration of the authorization agreement 412, limitations on use of the features 414, and a fee for use of the features 416.

FIG. 5 illustrates an exemplary list 500 of parameters and data that may be included in an exemplary authorization agreement between a manufacturer or OEM and another entity (e.g., an entity operating an authorization server) in accordance with aspects described herein. The listing is presented in tabular form in FIG. 5, however, any machine readable (e.g., processing circuit readable) form is acceptable according to this aspect. The listing includes parameters, such as the starting date of an agreement 502, the ending date of the agreement 504, an identifier of the device 506 (e.g., an IMEI number), a list of authorized features 508, limitations on use of the features 510, an identifier of the public key 512 of the device, an identifier of the manufacturer or OEM 514 of the device, and a fee for use of the features 516.

Figure 6:
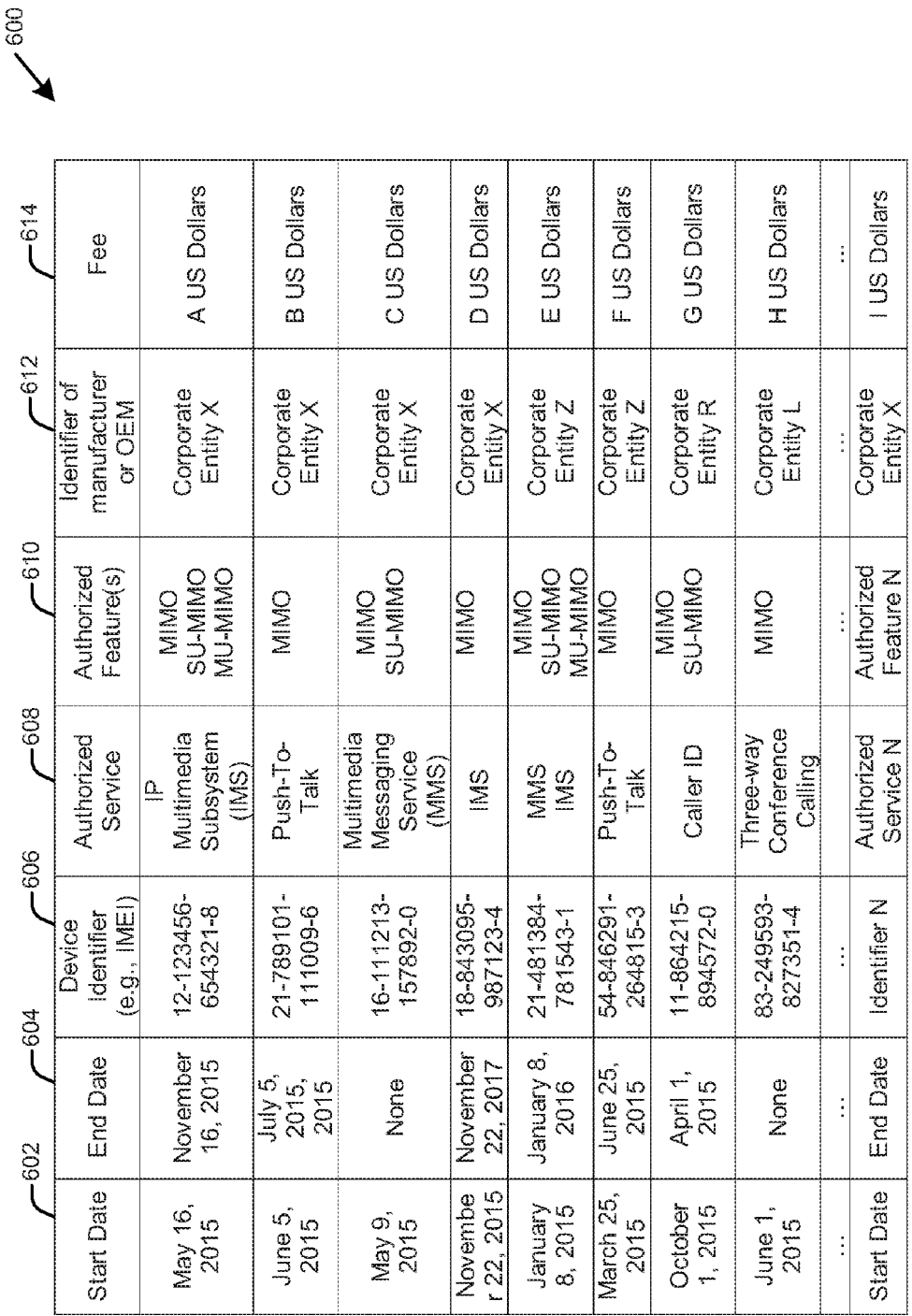
FIG. 6 illustrates an exemplary list of parameters and data that may be included in an exemplary authorization agreement between a network operator and another entity accordance with aspects described herein.

FIG. 6 illustrates an exemplary listing 600 of parameters and data that may be included in an exemplary authorization agreement between a network operator (e.g., a mobile network operator (MNO)) and another entity (e.g., owner/operator of the authorization server) in accordance with aspects described herein. The exemplary listing 600 is presented in tabular form in FIG. 6, however, any machine readable (e.g., processing circuit readable) form is acceptable according to this aspect. The exemplary listing 600 includes parameters such as the starting date of the authorization agreement 602, the ending date of the authorization agreement 604, an identifier of the device 606 (e.g., an IMEI number), a list of authorized service(s) 608, a list of authorized features 610, an identifier of the manufacturer or OEM of the device 612, and a fee for use of the features 614.

Provisioning

Figure 7:
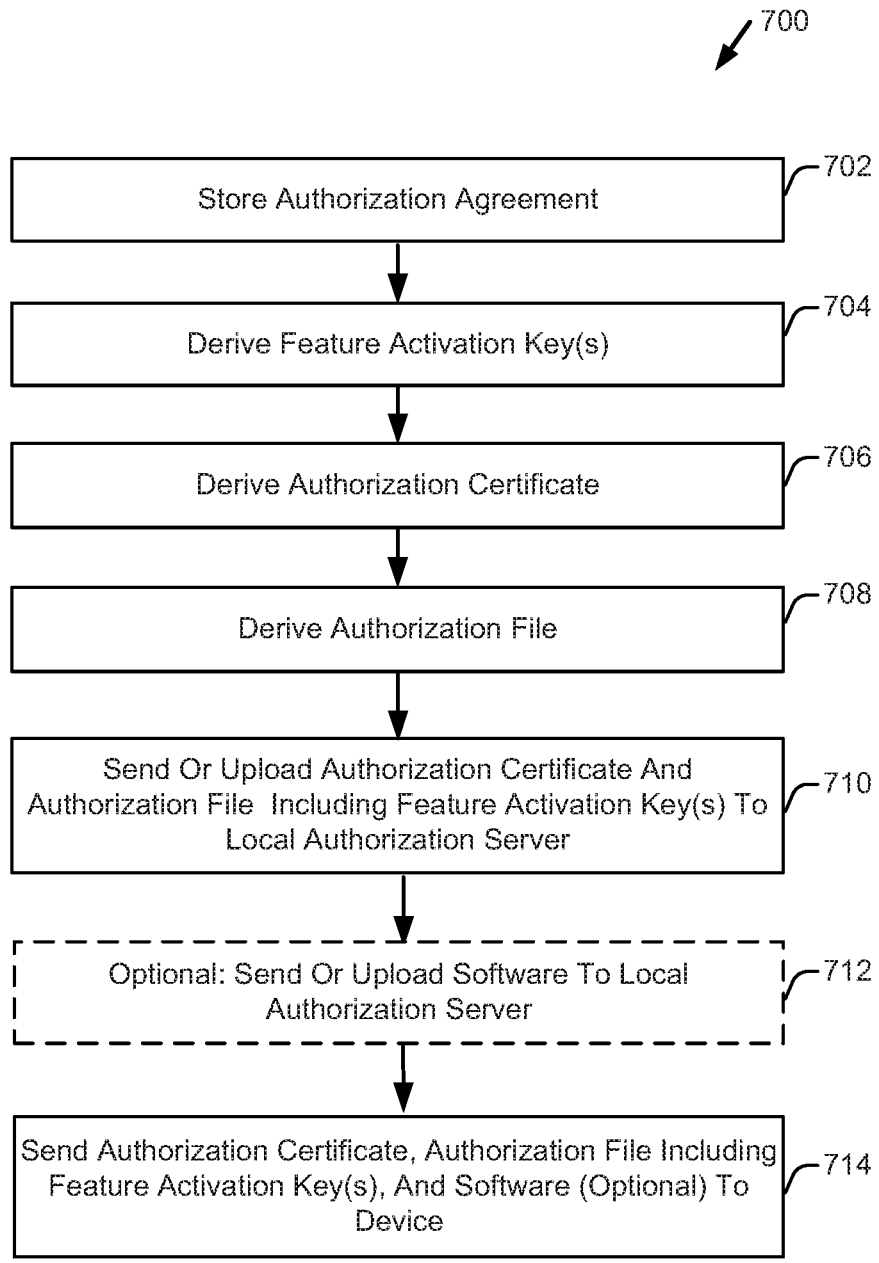
FIG. 7 is a flow diagram illustrating actions related to sending of authorization certificates, authorization files, feature activation keys, and software to devices in accordance with aspects described herein.

FIG. 7 is a flow diagram strafing actions related to sending of authorization certificates, authorization files, feature activation keys, and software to devices (e.g., chip components, client devices, network nodes) in accordance with aspects described herein. In one aspect, actions identified with reference numbers 702-712 may be taken by an authorization server, while the action identified with reference number 714 may be taken by a local authorization server. In one aspect, actions identified with reference numbers 702-714 may be taken by the authorization server. That is, in such aspects, the authorization server may derive and send an authorization certificate, authorization file, feature activation key(s), and/or software to a device without intervention of the local authorization server. In one aspect, actions identified with reference numbers 702-714 may be taken by the local authorization server. That is, in such aspects, the local authorization server may derive and send the authorization certificate, authorization file, feature activation key(s), and/or software to the device without intervention of the authorization server.

As described above, authorization agreements may be entered into between various entities (e.g., an owner of a device, seller/re-seller of the device, service provider that offers the device to customers with or without a discount, a manufacturer, or OEM of a device). For example, one entity may pay a second entity a fee for a r to use a service or selectively activated feature for a predefined time (e.g., quarterly). Once the entities have entered into the authorization agreement, the authorization agreement may be stored 702 on an authorization server. The authorization server may derive feature activation keys(s) 704 based on information in the authorization agreement (e.g., derive feature activation keys(s) 704 based on the authorization agreement). The authorization server may derive an authorization certificate 706 based on information in the authorization agreement. The authorization server may also derive an authorization file 708 based on information in the authorization agreement. In some aspects, the authorization file may include one or more feature activation keys. The order of these actions is exemplary and not limiting. Any order is acceptable.

A feature activation key may be used to activate a selectively activated feature of a device (e.g., chip component, client device, network node). The feature activation key may be encrypted, and/or the authorization file having the feature activation key(s) therewith may be encrypted. In some examples, the feature activation key(s) and/or authorization file may only be decrypted by the authorization function of the device.

In some aspects, one feature activation key per selectively activated feature may be used for selectively activated feature activation. In other aspects, one feature activation key may be used to activate multiple selectively activated features. Activating a selectively activated feature may include an initial activation of the selectively activated feature as well as maintaining activation of an already activated selectively activated feature. In one aspect, a feature activation key may unlock a selectively activated feature. By way of example, a selectively activated feature may be activated, but may be locked from use based on terms of the authorization agreement (e.g., the selectively activated feature may be locked from use based on a geographic or time-related parameter limitation imposed by the authorization agreement). The activated selectively activated feature may be unlocked (e.g., the ability of the device to use the already activated selectively activated feature may be enabled) based on obtaining and using of an appropriate feature activation key.

An authorization file may include data relevant to a selectively activated feature. Data relevant to a selectively activated feature may include, for example, the date upon which authority of the device to use the selectively activated feature expires or is revoked. Other data relevant to the selectively activated feature may also be included in the authorization file.

In one aspect, the authorization server may send or upload 710 (e.g., provision) the authorization certificate and the authorization file including feature activation key(s) to a local authorization server. The authorization server may optionally send or upload software 712 related to selectively activated features of a device, or any feature (hardware or software) related to the device, to the local authorization server. For example, software in the form of an updated driver may be sent or uploaded in addition to the authorization certificate and authorization file.

The authorization server and/or local authorization server may send 714 the authorization certificate, authorization file including feature activation key(s), and software (optional), to a device (e.g., chip component, client device, network node) in response, for example, to obtaining a feature activation request from the device.

In an example, when multiple devices are included in an authorization agreement, the local authorization server may ensure that no more than a maximum number of devices (e.g., a quota) are using an authorized selectively activated feature. For example, the local authorization server may receive an indication when a selectively activated feature is deactivated at a first device before the local authorization server issues an authorization to activate the selectively activated feature at a second device. Alternatively, the local authorization server may revoke an authorization to activate a selectively activated feature at a first device before the local authorization server issues an authorization to activate the selectively activated feature at a second device. The revocation may be based, for example, on a periodic reporting from all authorized devices to determine in which devices the selectively activated feature is being actively used.

Feature Activation Request

Figure 8:
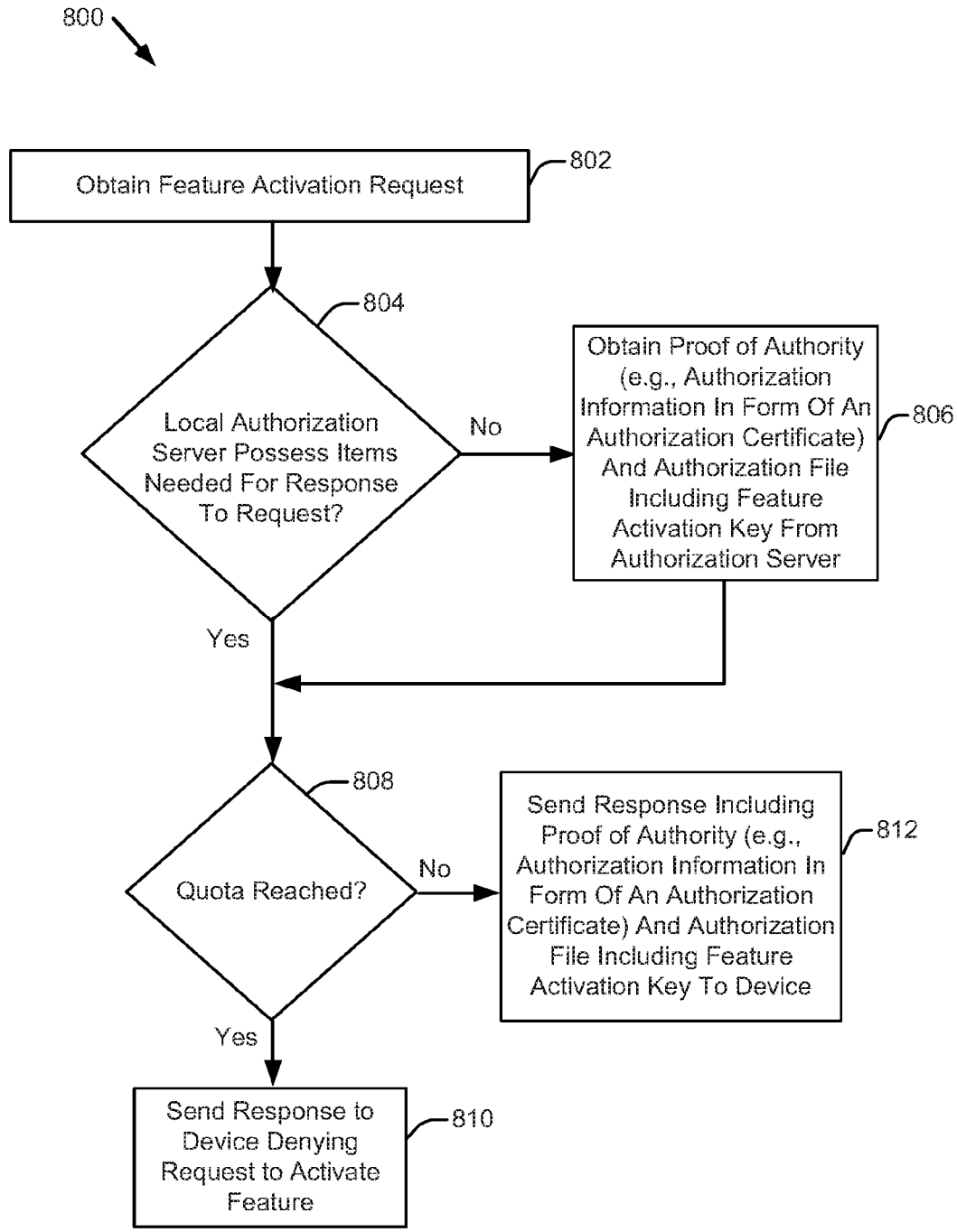
FIG. 8 is a flow diagram illustrating a method involving a feature activation request in accordance with aspects described herein.

FIG. 8 is a flow diagram 800 illustrating a method involving a feature activation request (e.g., a request to activate one or more features, a request for authorization to activate one or more features) in accordance with aspects described herein. A device (e.g., a chip component, client device, network node) may activate a selectively activated feature if the device has authorization to do so. Various events may result in the device sending a feature activation request. For example, the selectively activated feature may be needed to use a network service, an administrator may determine to configure the device in a way that invokes the selectively activated feature, a subscription update may occur, and/or an operation, administration, and management (OAM) protocol may need to activate the selectively activated feature for maintenance purposes.

To activate the selectively activated feature, the device may obtain proof of authority for the device to use the selectively activated feature at the device, and obtain an authorization file including feature activation key(s). Proof of authority may be provided, for example, in the form of authorization information. The authorization information may include the authorization agreement and/or an authorization certificate. In an example, to obtain the proof of authority for the device to use the selectively activated feature and the authorization file including feature activation key(s), the device may send a feature activation request (e.g., a request to activate one or more selectively activated features) to a local authorization server.

The local authorization server may obtain 802 the feature activation request from the device. The local authorization server may determine 804 if the local authorization server possesses items needed for a response to the request (e.g., a proof of authority for the device to use a set of selectively activated features at the device, such as authorization information, and an authorization file including feature activation key(s)). If the local authorization server does not possess the items needed, or if the local authorization server possesses the items but the items are not valid (e.g., due to expiration of an authorization), the local authorization server may attempt to obtain 806 the proof of authority (e.g., authorization information in the form of an authorization certificate) and the authorization file including feature activation key(s) from an authorization server.

In one aspect, the local authorization server may obtain 806 the proof of authority (e.g., authorization information in the form of an authorization certificate) and the authorization file including feature activation key(s) from the authorization server by forwarding the feature activation request to the authorization server. The authorization server may send the proof of authority (e.g., authorization information in the form of an authorization certificate) and the authorization file including feature activation key(s) if, for example, an authorization agreement confirms that the requested selectively activated features are authorized. In the case where the feature activation request is sent to the authorization server, the local authorization server may act as a proxy server that provides a secure tunnel between the device (e.g., chip component, client device, network node) and the authorization server. After verifying the authorization agreement (e.g., between the device and a licensing service and/or between the mobile network operator and the licensing service), the authorization server may send the proof of authority (e.g., authorization information in the form of an authorization certificate) and the authorization file including feature activation key(s) to the local authorization server.

If the local authorization server possesses the proof of authority (e.g., authorization information in the form of an authorization certificate) and the authorization file, the local authorization server may determine 808 if a quota is reached for the requested selectively activated feature. If the quota for the requested selectively activated feature is reached, the local authorization server may send a response to the device denying 810 the request to activate the selectively activated feature. A reason for the denial may be included with the response. If the quota for the requested selectively activated feature is not reached, the local authorization server may send a response to the device 812 including, for example, the proof of authority (e.g., authorization information in the form of an authorization certificate) and the authorization file including feature activation key(s).

A local authorization server may cache authorization agreements, authorization certificates, authorization files, feature activation key(s), and optional software for future use. In an aspect, the caching may apply when the local authorization server issues an authorization certificate on behalf of the authorization server and reports the authorization status to the authorization server.

Activation of Selectively Activated Features

Figure 9:
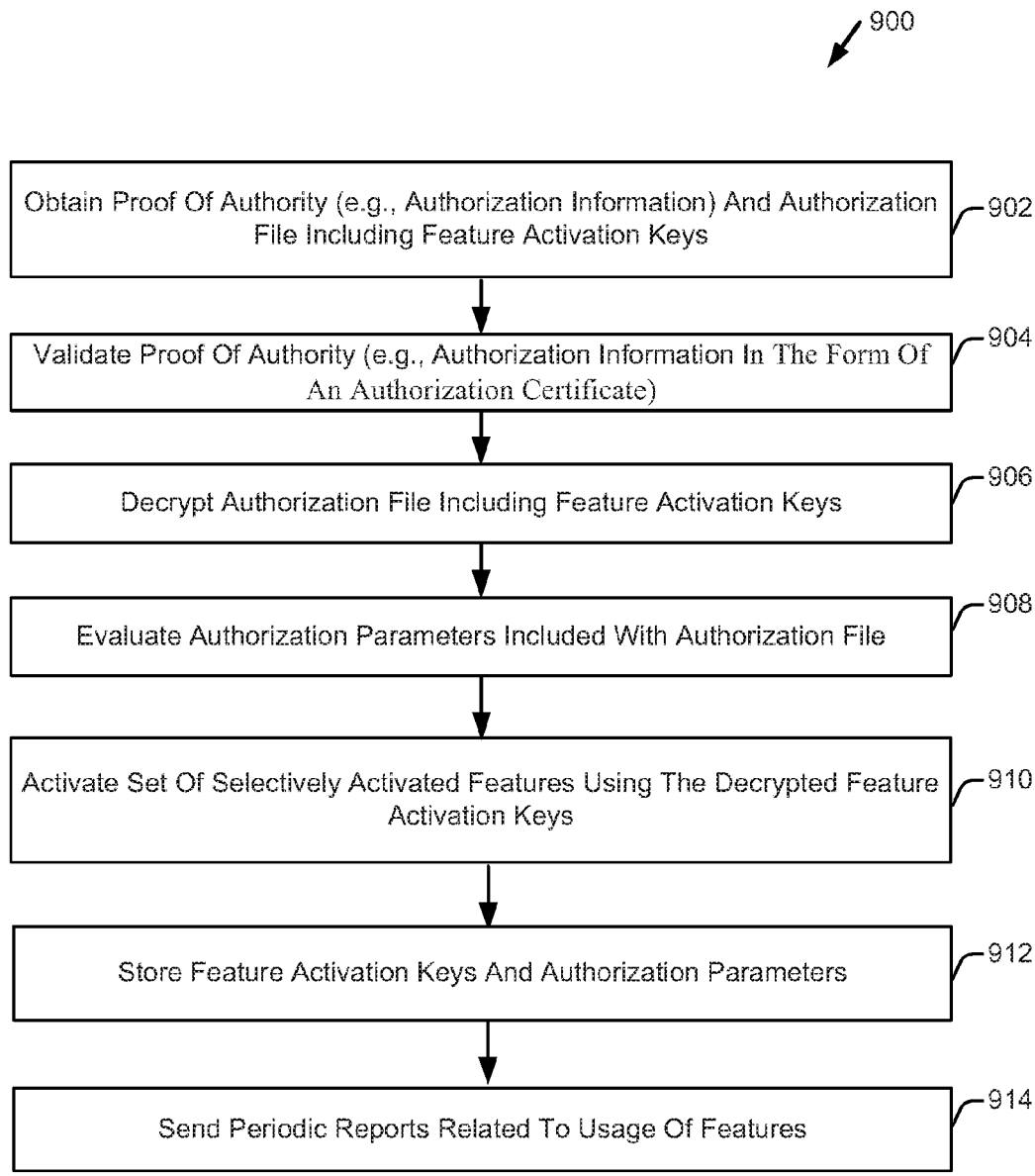
FIG. 9 is a flow diagram illustrating one example of activation of selectively activated features in accordance with aspects described herein.

FIG. 9 is a flow diagram 900 illustrating one example of activation of selectively activated features in accordance with aspects described herein. A device (e.g., chip component, client device, network node), or an authorization function of the device, may obtain 902 proof of authority (e.g., authorization information in the form of an authorization certificate) of the device to use a set of selectively activated features at the device, where the proof of authority is signed by an authorization server, and may also obtain an authorization file including feature activation keys. In one aspect, the proof of authority and authorization file may be obtained in response to a feature activation request (e.g., a request to activate one or more selectively activated features). The authorization file may include feature activation keys encrypted with the public key of the device. The authorization function may validate 904 the proof of authority (e.g., authorization information in the form of an authorization certificate). In one aspect, validation may include using a validation function and the public key of the authorization server. If the proof of authority (e.g., authorization information in the form of an authorization certificate) is validated, the device may decrypt 906 the authorization file including feature activation keys using a private key of the device. The authorization function may retrieve the feature activation keys from the decrypted authorization file. The authorization function may evaluate 908 authorization parameters included with the authorization file (e.g., confirm that authorization parameters, such as an expiration date of the authority of a device to use a selectively activated feature, are not expired). The authorization function may then activate the set of selectively activated features 910 using the decrypted feature activation keys.

Any activated selectively activated feature may remain activated until a deactivation event occurs. One example of a deactivation event could be the reaching of an expiration time specified in the authorization parameters associated with the activated selectively activated feature. Other deactivation events are acceptable. The authorization function may store 912 the retrieved feature activation key at a secure storage device of the device. The authorization function may also store 912 the retrieved authorization parameters at a data storage device of the device.

In one example, the authorization function of the device may be able to decrypt the authorization file reliably and with good assurance of security at least because the authorization server may have encrypted the authorization file using a public key (of a public/private key pair) of the device, the device may have stored the private key in the secure storage circuit of the device, and the private key may be only known to the authorization function. The device may rely on the authorization function to ensure that activation of the selectively activated feature(s) is appropriate. Additionally, when the device receives an authorization certificate from the network (e.g., authorization server), the device should be able to verify that the authorization certificate is a correct authorization certificate sent by the authorization server (e.g., not sent by an imposter). In one example, to facilitate the ability of the device to verify that the authorization certificate is a correct authorization certificate sent by the authorization server, the authorization server can add a signature of the authorization server (derived with a private key of the authorization server) to the authorization certificate. The signature of the authorization server may be verified at the device using the public key of the authorization server. Similarly, when the device receives an authorization file from the network (e.g., authorization server), the device should be able to verify that the authorization file is a correct authorization file sent by the authorization server (e.g., not sent by an imposter). In one example, to facilitate the ability of the device to verify that the authorization file is a correct authorization file sent by the authorization server, the authorization server can add a signature of the authorization server (e.g., a signature derived with a private key of the authorization server) to the authorization file. The signature of the authorization server may be verified at the device using the public key of the authorization server.

The device may monitor the usage of the activated selectively activated feature and may send 914 periodic reports related to the usage of the selectively activated features (e.g., report the activation status) to the authorization server and/or the local authorization server. The authorization server and/or the local authorization server may aggregate the reports related to the usage of selectively activated features from all devices that send such reports. A report on the usage status of the selectively activated features may be referred to herein as a status report. Periodic status reports may be used, for example, to enforce limitations on the rights of devices to use selectively activated features. For example, an authorization server (or local authorization server) may use data obtained from the status reports to verify that greater than a maximum number of devices are, or are not, concurrently using a selectively activated feature. If greater than a maximum number of devices are concurrently using the selectively activated feature (e.g., a quota is reached), new requests to activate the selectively activated feature may be denied. Records relating to usage, license fees, etc. may be derived and maintained.

Orchestration Procedure

In one aspect, upon successful feature activation at a device (e.g., chip component, client device, network node), the authorization server may transmit data to an HSS/AAA server associated with the device to inform the HSS/AAA server of the updated features/updated capability of the device.

The HSS/AAA server may update a subscription profile of the device and may send the information to network nodes (e.g., eNodeB, MME, P-GW, etc.) after the updated device features are verified by a network operator (e.g., an MNO). In some aspects, it can be the role of the network operator to update a subscription profile based on the capability and authorization status of the device.

Updating the subscription profile of the device, once the request to activate one or more features is approved and/or the features are activated, may permit a network node (e.g., eNB, MME, S-GW, P-GW) to validate the authorization of a device to use a feature without a need for the network node to obtain another form of proof. For example, updating the subscription profile to permit the network node to validate the authorization of the device to use the feature based on the subscription profile and may obviate a need of the network node to obtain, from the device, proof of authority for the device to use a set of selectively activated features at the device.

In one aspect, when the device is a network access node (e.g., an eNodeB), information concerning the availability of a certain set of features/services that are activated at the network access node may be sent to a device. In some implementations, the certain set of features/services that are activated at the network access node may be announced to devices (e.g., chip components, client devices) via an over-the-air broadcast (e.g., a system information block (SIB) Type 1 broadcast). In some implementations, a device may use a protocol to query the network access node, and thereby may determine the availability of the certain set of features/services that may be activated at the network access node. One example of such a query protocol may be an access network query protocol (ANQP). Other query protocols are acceptable. In these exemplary ways, a device may become aware of the features/services available from the network access node so that the device can determine if the device wants to make use of the features/services after mutual authentication.

Exemplary Call Flow Diagram of Feature Activation

Figure 10:
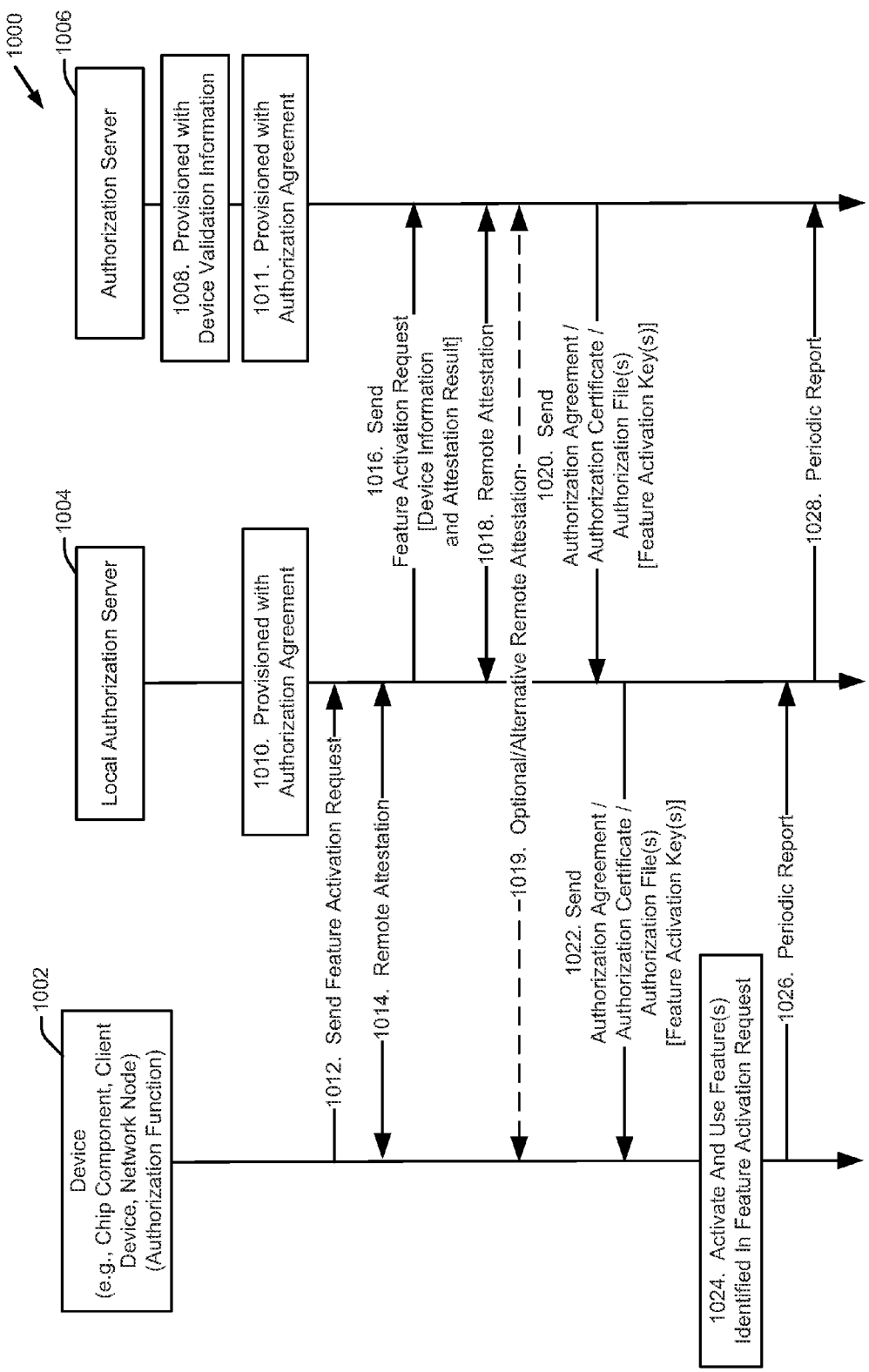
FIG. 10 is a call flow diagram related to dynamic authorization and activation of features of a device in accordance with aspects described herein.

FIG. 10 is a call flow diagram 1000 related to dynamic authorization and activation of selectively activated features of a device 1002 in accordance with aspects described herein. The dynamic authorization and activation of features of a device 1002 may be useful in a system where, for example, one or more selectively activated features may be needed at the device 1002 to use a network service, and network services and/or device features can be individually enabled via licenses in real time. FIG. 10 depicts interactions between a device 1002 (e.g., chip component, client device, network node), a local authorization server 1004, and an authorization server 1006. In the context of FIG. 10, call flow to and from the device 1002 may be to and from an authorization function of the device 1002.

An authorization server 1006 may be provisioned 1008 with device validation information/integrity information from a vendor/OEM or another entity. The device validation information/integrity information may include a device identifier, a device certificate/public key, software version (e.g., software version of software associated with the authorization function residing on the device 1002), and/or device capabilities. This list is non-limiting and is not exclusive. Device capabilities may include a listing of selectively activated features at the device 1002. It will be understood that sending device validation information/integrity information from the vendor/OEM or another entity to the authorization server may be an ongoing process. Device validation information/integrity information may be added, modified, or removed from the authorization server 1006 at any suitable time.

An authorization agreement may be entered into between two entities. The authorization agreement (or a copy thereof) may be provisioned to the local authorization server 1004 for storage 1010 and may be provisioned to the authorization server 1006 for storage 1011. Persons skilled in the art will appreciate that the order of provisioning may be reversed. Accordingly, the authorization agreement may be stored in local storage at the local authorization server 1004 and the authorization server 1006. The authorization agreement may include a provision requiring the validation of software running at the local authorization server.

A device 1002. (or an authorization function of the device 1002) may send a feature activation request 1012 (e.g., a request to activate one or more features) to the local authorization server 1004. The feature activation request may include a certificate signing request for certificate based verification.

The device 1002 and local authorization server 1004 may engage in remote attestation 1014. Remote attestation may be used by one entity to verify that another entity is working correctly (e.g., based on a known correct state). In one aspect, the local authorization server 1004 may validate the software running at the device (e.g., by verifying that the software identified in the device validation information/integrity information provisioned to the application server matches the software running at the device). The result of remote attestation 1014 may be used to assure the authorization server 1006 that an attacker has not compromised the device 1002 and that the device 1002 is running software described/identified by the vendor/OEM. If remote attestation is not successful, the feature activation request may be ignored.

If remote attestation is successful, based on the authorization agreement (e.g., the authorization agreement provisioned to the local authorization server for storage 1010), the local authorization server 1004 may determine whether to request feature activation for the device to the authorization server 1006 (e.g., send feature activation request 1016) or authorize feature activation for the device on its own authority (e.g., send authorization agreement/authorization certificate/authorization file(s) including feature activation key(s) 1022). The latter scenario may occur, for example, when the local authorization server 1004 has obtained one or more authorization keys (e.g., feature activation keys) from the authorization server 1006 in advance, based on the authorization agreement.

If the local authorization server 1004 determines to request feature activation for the device to the authorization server 1006, the local authorization server 1004 may send (e.g., forward) the feature activation request 1016 to the authorization server 1006, in which case, the local authorization server 1004 may be a proxy server that provides a secure tunnel between the device 1002 and the authorization server 1006. The feature activation request may include device information (e.g., a device identifier, a device certificate/public key, software version) and remote attestation results. The feature activation request 1016 sent to the authorization server 1006 may also include the certificate signing request, if the certificate signing request was included with the feature activation request sent to the local authorization server from the device.

In one aspect, the local authorization server 1004 and authorization server 1006 may engage in remote attestation 1018. For example, the local authorization server 1004 may send proof to the authorization server 1006 that the local authorization server 1004 is running the correct software. In this way, the authorization server 1006 may be able to trust the information about the device 1002 provided to the authorization server 1006 by the local authorization server 1004. In accordance with such an aspect, the authorization server 1006 may accept a result of the remote attestation preformed between the device 1002 and the local authorization server 1004. Optionally or alternatively, the authorization server 1006 and the device 1002 may engage in remote attestation 1019.

Once the authorization server 1006 accepts the results of the remote attestation (with either or both of the local authorization server 1004 and the device 1002) (e.g., verification is successful) and the authorization server 1006 determines that the feature activation request complies with the terms of the authorization agreement, the authorization server 1006 may send 1020 the proof of authorization to activate the selectively activated feature (e.g., authorization information) and the authorization file including feature activation key(s) to the local authorization server. In one aspect, the authorization server 1006 may verify an authorization agreement of the device 1002 with a network operator (e.g., an MNO) (or a third entity). The proof of authorization (e.g., authorization information) sent by the authorization server 1006 may include an authorization agreement and/or an authorization certificate.

The local authorization server 1004 may send the authorization agreement/authorization certificate/authorization file(s) including feature activation key(s) 1022 to the device 1002. In a first example, the local authorization server 1004 may determine to request feature activation for the device from the authorization server 1006. In response to the request, the local authorization server 1004 may obtain the proof of authorization to activate the selectively activated feature (e.g., authorization information) and the authorization file including feature activation key(s) from the authorization server 1006. Accordingly, under the circumstances of the first example, the local authorization server may send the authorization agreement/authorization certificate/authorization file(s) including feature activation key(s) 1022 to the device 1002. In a second example, the local authorization server 1004 may determine to authorize feature activation for the device 1002 on its own authority (e.g., in the case where the local authorization server 1004 obtained one or more feature activation keys from the authorization server 1006 in advance, based on the authorization agreement). Accordingly, under the circumstances of the second example, the local authorization server may send the authorization agreement/authorization certificate/authorization file(s) including feature activation key(s) 1022 to the device 1002. In general, the local authorization server 1004 may send the proof of authorization to activate the feature (e.g., authorization information) and the authorization file(s) (including feature activation key(s) and software, if necessary) to the device 1002. The proof of authorization to activate the feature (e.g., authorization information) may be in the form an authorization agreement and/or an authorization certificate. Additionally, the local authorization server 1004 may store (e.g., cache) the authorization agreement and/or the authorization certificate and authorization file including feature activation key(s) (and software, if necessary) for future use.

Once the device 1002 receives the proof of authorization to activate the selectively activated feature (e.g., authorization information) and the authorization file including feature activation key(s) (e.g., in response to a feature activation request), the device 1002 (and/or authorization function of the device) may validate the proof of authorization (e.g., authorization information) to determine whether the device 1002 (and/or authorization function of the device) is authorized to activate and use the requested feature(s). If the device (and/or authorization function of the device) determines that the device is authorized to activate and use the requested feature(s), the device (and/or authorization function of the device) may retrieve the feature activation key(s) for the requested feature(s) and activate and use the requested feature(s) 1024. In some implementations, the requested feature(s) may remain activated until an expiration time specified in the authorization certificate.

The device 1002 may send a periodic report 1026 to the local authorization server 1004 regarding usage of the activated features. The local authorization server 1004 may aggregate reports received from a plurality of devices and may send a periodic report 1028 to the authorization server 1006 regarding usage of the activated features. Those of skill in the art will understand that various systems may use various types of usage reporting formats. The aspects described herein are not limited to any one usage reporting format.

Periodic reports may give some flexibility to the local authorization management by allowing an operator to activate a selectively activated feature at a plurality of chip components/client devices/network nodes as long as the total number of activated features satisfies the terms of a pertinent authorization agreement. For example, the periodic reporting may allow an operator to activate a maximum allowable number of features concurrently.

Exemplary Device

Figure 11:
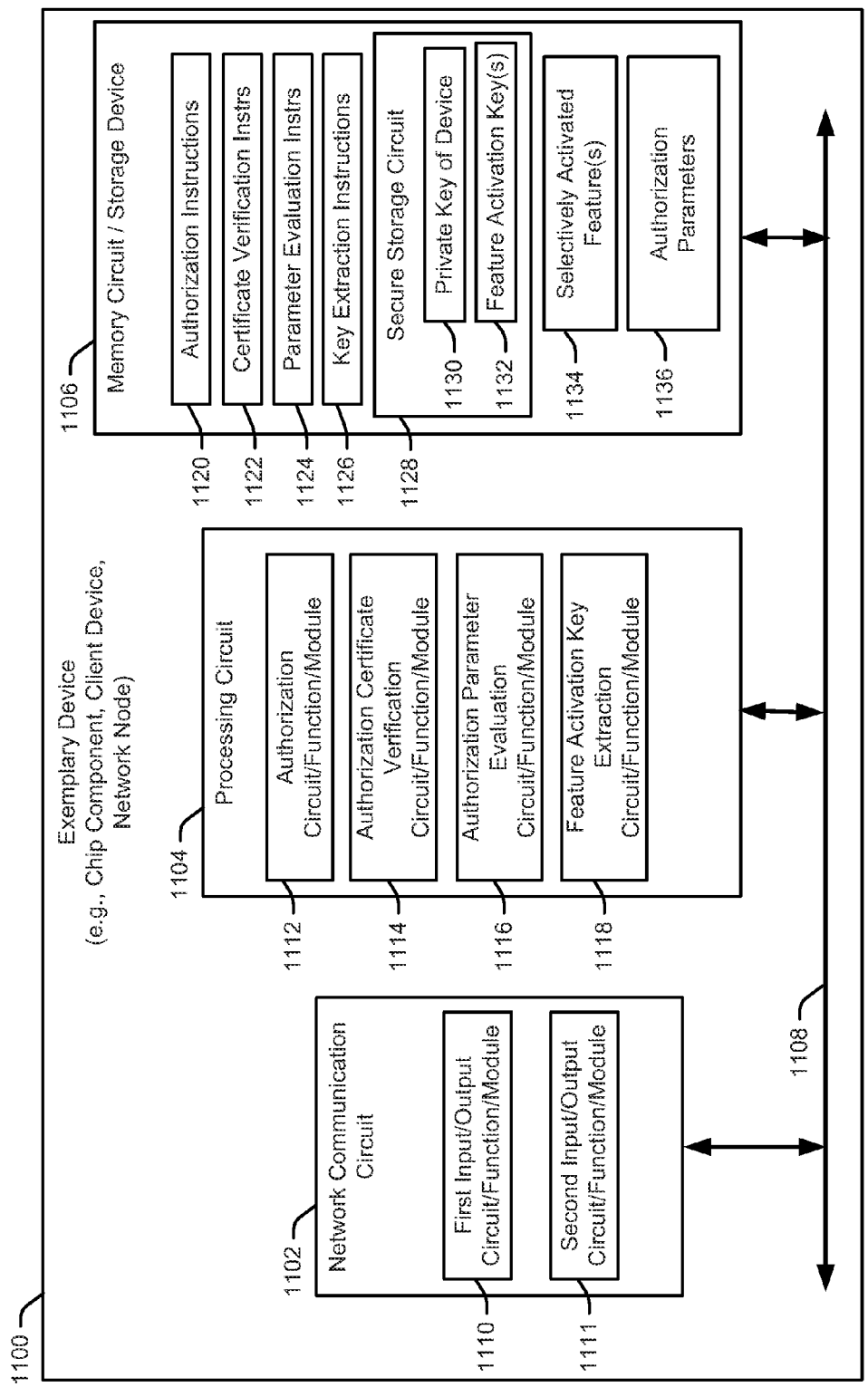
FIG. 11 is a block diagram illustrating an exemplary device adapted to support dynamic authorization and activation of features to facilitate use of network services on the device in accordance with aspects described herein.

FIG. 11 is a block diagram illustrating an exemplary device 1100 (e.g., chip component, client device, network node) adapted to support dynamic authorization and activation of selectively activated features to facilitate use of network services on the exemplary device 1100 in accordance with aspects described herein. In one example, the exemplary device 1100 may include a network communication circuit 1102, a processing circuit 1104, and a memory circuit/storage device (referred to herein as a memory circuit 1106). The network communication circuit 1102, processing circuit 1104, and memory circuit 1106 may be coupled to a communication bus 1108 for exchange of data and instructions.

The network communication circuit 1102 may include a first input/output circuit/function/module 1110 for input/output operations with a user. The network communication circuit 1102 may include a second input/output circuit/function/module 1111 (e.g., a receiver/transmitter module/circuit/function) for wireless communication. Other circuits/functions/modules may be included with the network communication circuit 1102 as known to those of skill in the art. The preceding information is exemplary and non-limiting.

The processing circuit 1104 may be adapted to include or implement one or more processors, application specific processors, hardware, and/or software modules, etc., that are adapted to support dynamic authorization and activation of selectively activated features to facilitate use of network services on an exemplary device 1100. The processing circuit 1104 may be adapted to include an authorization circuit/function/module 1112, an authorization certificate verification circuit/function/module 1114, an authorization parameter evaluation circuit/function/module 1116, and a feature activation key extraction circuit/function/module 1118. Other circuits/functions/modules may be included with the processing circuit 1104 as will be known to those of skill in the art. The preceding information is exemplary and non-limiting.

The memory circuit 1106 may be adapted to include authorization instructions 1120, authorization certificate verification instructions 1122, authorization parameter evaluation instructions 1124, and feature activation key extraction instructions 1126. A separate area of the memory circuit 1106 may be adapted for secure storage. Accordingly, the memory circuit 1106 may further include a secure storage circuit 1128. The secure storage circuit 1128 may include private key storage 1130. The private key storage 1130 may store the private key of a public/private key pair, where an authorization server or local authorization server uses the public key of the public/private key pair to encrypt an authorization certificate. The secure storage circuit 1128 may further include feature activation key storage 1132. The memory circuit 1106 may further store a listing of selectively activated features 1134 as well as a listing of authorization parameters for each of the selectively activated features of the device 1136. Other instructions and locations for storage of data may be included in the memory circuit 1106 as will be known to those of skill in the art. The preceding information is exemplary and non-limiting.

Exemplary Methods Operational at a Device

Figure 12:
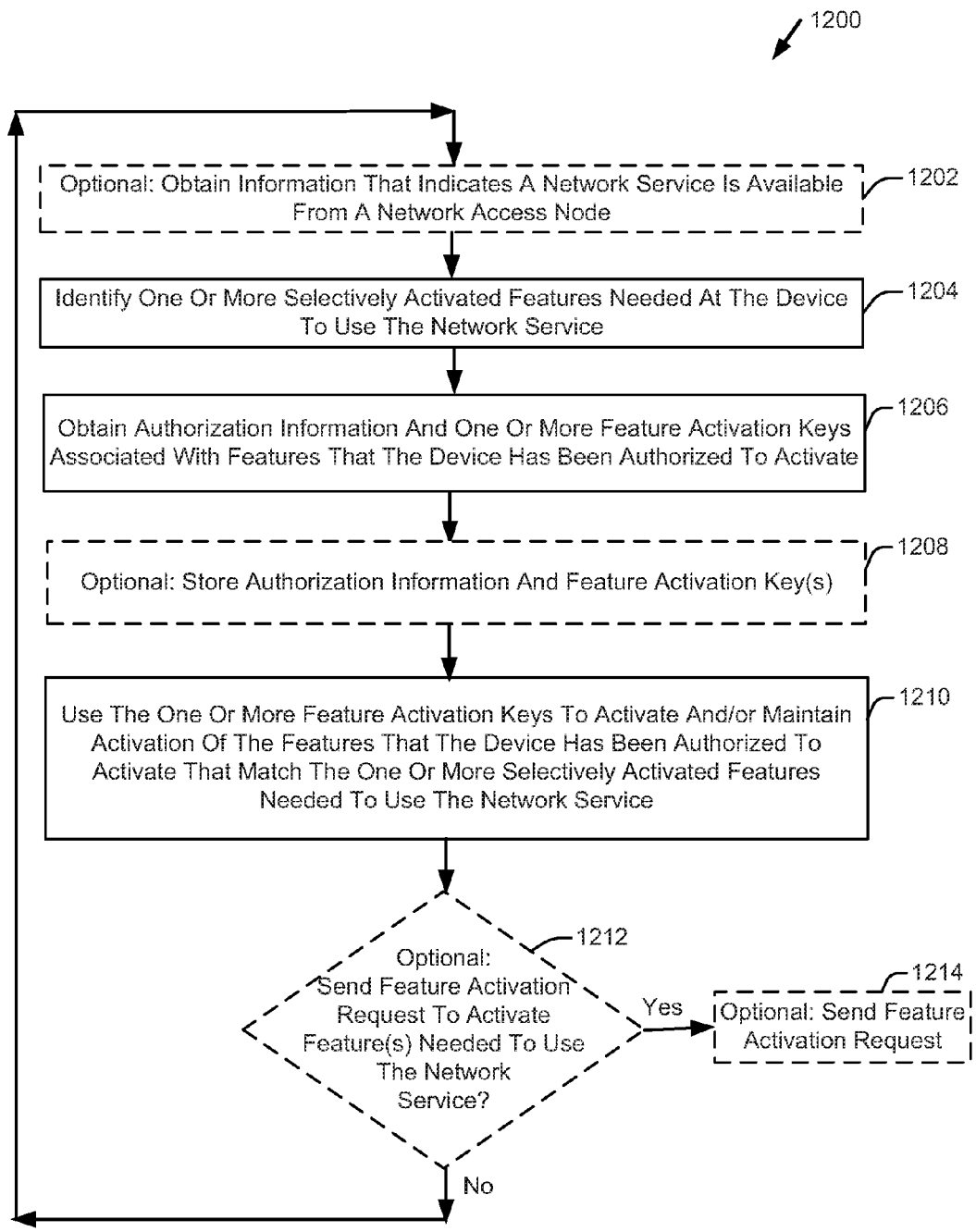
FIG. 12 is a flowchart of an exemplary method, which may be operational at a device in accordance with aspects described herein.

FIG. 12 is a flowchart of an exemplary method 1200, which may be operational at a device (e.g., chip component, client device, network node) in accordance with aspects described herein. Optionally, the device may obtain information that indicates a network service is available from a network access node 1202 (e.g., eNB). The device may identify one or more selectively activated features needed at the device to use the network service 1204. In some aspects, identifying one or more selectively activated features needed at the device to use the network service, may include obtaining, from a memory circuit of the device, a list of features needed to use the network service. In other aspects, identifying one or more selectively activated features needed at the device to use the network service may include obtaining from a network node a list of features needed to use the network service.

The device may obtain authorization information and one or more feature activation keys associated with selectively activated features that the device has been authorized to activate 1206. In some implementations, obtaining the authorization information and one or more feature activation keys may include sending a request to authorize activation of one or more features, obtaining the authorization information and one or more feature activation keys in response to the request to authorize activation of the one or more selectively activated features, and storing the authorization information and feature activation key(s).

Optionally, the device may store the obtained authorization information and feature activation key(s) 1208. The device may determine if a match exists between the features that the device has been authorized to activate and the one or more selectively activated features needed on the device to use the network service.

The device may use the one or more feature activation keys to activate and/or maintain activation of the selectively activated features that the device has been authorized to activate that match the one or more selectively activated features needed to use the network service 1210. Optionally, if the match does not exist, the device may determine whether to send a feature authorization request for authorization to activate the selectively activated features that are needed to use the network service 1212. The device may thereafter send the feature activation request 1214 or wait to obtain information that indicates a network service is available from the network access node 1202, depending on the result of the determination.

In some aspects, the selectively activated features may be hardware and/or software features. Authorization information may be sent by the device to another device and/or node as proof that the device was authorized to activate a feature identified in the authorization information.

In some aspects, obtaining authorization information and one or more feature activation keys may include sending a feature activation request, obtaining the authorization information and feature activation keys in response to the feature activation request, and storing the authorization information and feature activation keys. Storing authorization information and feature activation keys may be optional.

In some aspects, the authorization information may include, for each of the features that the device has been authorized to activate, a date upon which authorization will expire. The authorization information may be obtained as data representative of an authorization certificate. The authorization certificate may be signed by an authorization server that stores an authorization agreement from which the authorization certificate is based (e.g., the authorization certificate may be derived from the authorization agreement, or otherwise created based on the authorization agreement). In one aspect, the authorization server may be different from an authorization, authentication, and accounting (AAA) server. In one aspect, identifying the one or more selectively activated features needed on the device to use the network service can include obtaining from a network access node a list of features needed to use the network service. In another aspect, identifying the one or more selectively activated features needed on the device to use the network service may include obtaining from a memory circuit/function/module of the device, a list of features needed to use the network service.

In some aspects, identifying one or more selectively activated features needed at the device to use the network service 1204, obtaining authorization information and one or more feature activation keys associated with features that the device has been authorized to activate 1206, and using the one or more feature activation keys to activate and/or maintain activation of the features that the device has been authorized to activate that match the one or more selectively activated features needed to use the network service 1210 may be performed by an authorization function of the device. The authorization function may be a point of enforcement of an authorization agreement (e.g., agreement, contract, license). The authorization agreement may be between, for example, a manufacturer/original equipment manufacturer (OEM) of the device or a component thereof and a licensing service.

In some aspects, the method may include storing the authorization information and feature activation keys relating to features that the device has been authorized to activate, wherein the authorization information related to a feature includes a date upon which authorization to activate the feature will expire. In some aspects, at least one of the features needed to use the network service is licensable upon use and is activated when verification of an up-to-date license is obtained at the device.

Figure 13:
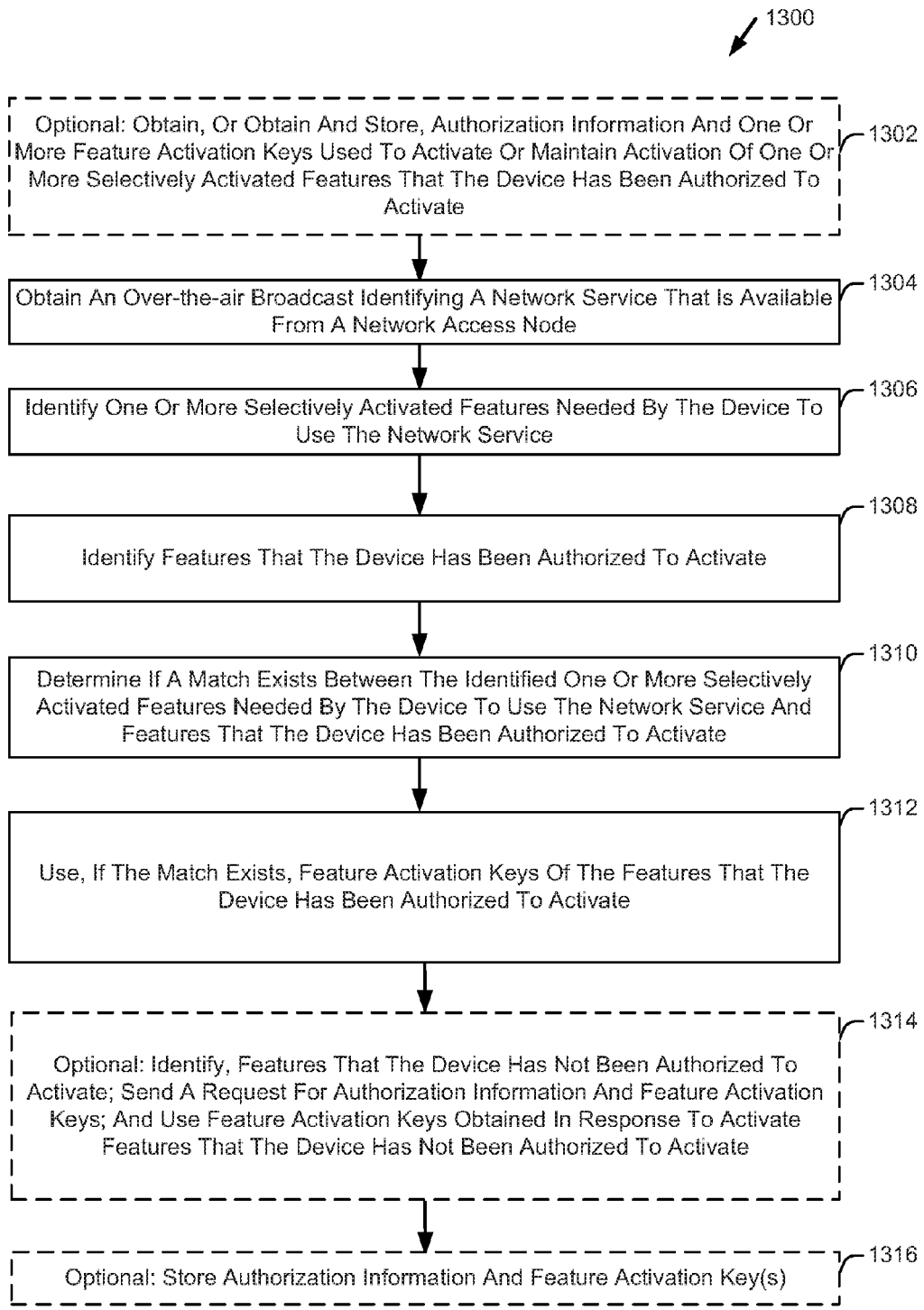
FIG. 13 is a flowchart of another exemplary method, which may be operational at a device in accordance with aspects described herein.

FIG. 13 is a flowchart of another exemplary method 1300, which may be operational at a device (e.g., chip component, client device, network node) in accordance with aspects described herein. Optionally, the device may obtain, or obtain and store, authorization information and one or more feature activation keys used to activate and/or maintain activation of one or more selectively activated features that the device has been authorized to activate 1302. The one or more selectively activated features may or may not be activated at any given time.

The device may obtain an over-the-air broadcast identifying a network service that available from a network access node (e.g., an eNodeB) 1304. In one aspect, the over-the-air broadcast may be obtained (e.g., received) in an unauthenticated message. In one aspect, the device may not be attached to the network access node when the over-the-air broadcast is obtained (e.g., received). In other words, the network access node from which the over-the-air broadcast is obtained (e.g., received) may be unauthenticated and not attached to the device.

In some aspects, the over-the-air broadcast indicating network services that are available from network access nodes may be responsive to a query sent from the device that identified the one or more selectively activated features needed on the device to use a network service and/or identified the network service.

The device may identify one or more selectively activated features needed by the device to use the network service 1306. Identifying one or more selectively activated features may be made without regard to whether the device already possesses authorization to activate any selectively activated features.

Next, the device may identify features that the device has been authorized to activate 1308. The device may determine if a match exists between the identified one or more selectively activated features needed by the device to use the network service and features that the device has been authorized to activate 1310. The device may use, if the match exists, feature activation keys of the features that the device has been authorized to activate. The device may use these feature activation keys to activate and/or maintain activation of those features that match the identified one or more selectively activated features needed by the device to use the network service 1312.

Optionally, the device may identify, from the identified one or more selectively activated features needed by the device to use the network service, features that the device has not been authorized to activate. The device may send a request for authorization information and feature activation keys for the features that the device has not been authorized to activate, and use feature activation keys obtained in response to the request to activate the features that the device has not been authorized to activate 1314.

Optionally, the device may store the authorization information and feature activation key(s) 1316.

At the same time, the network access node, or network node, interfacing to the device may also need to activate a counter part of the one or more selectively activated features, in order to facilitate the use of the selectively activated features by the device.

In the aspects described above, obtaining and using authorization information and feature activation key(s) may be performed by an authorization function of the device. The authorization function may be a point of enforcement of an authorization agreement (e.g., agreement, contract, license). The agreement may be between a manufacturer/original equipment manufacturer (OEM) of the device or a component thereof and a licensing service. The agreement may be stored on an authorization server. The authorization server may be the same as or different from an authorization, authentication, and accounting (AAA) server.

Exemplary Authorization Server

Figure 14:
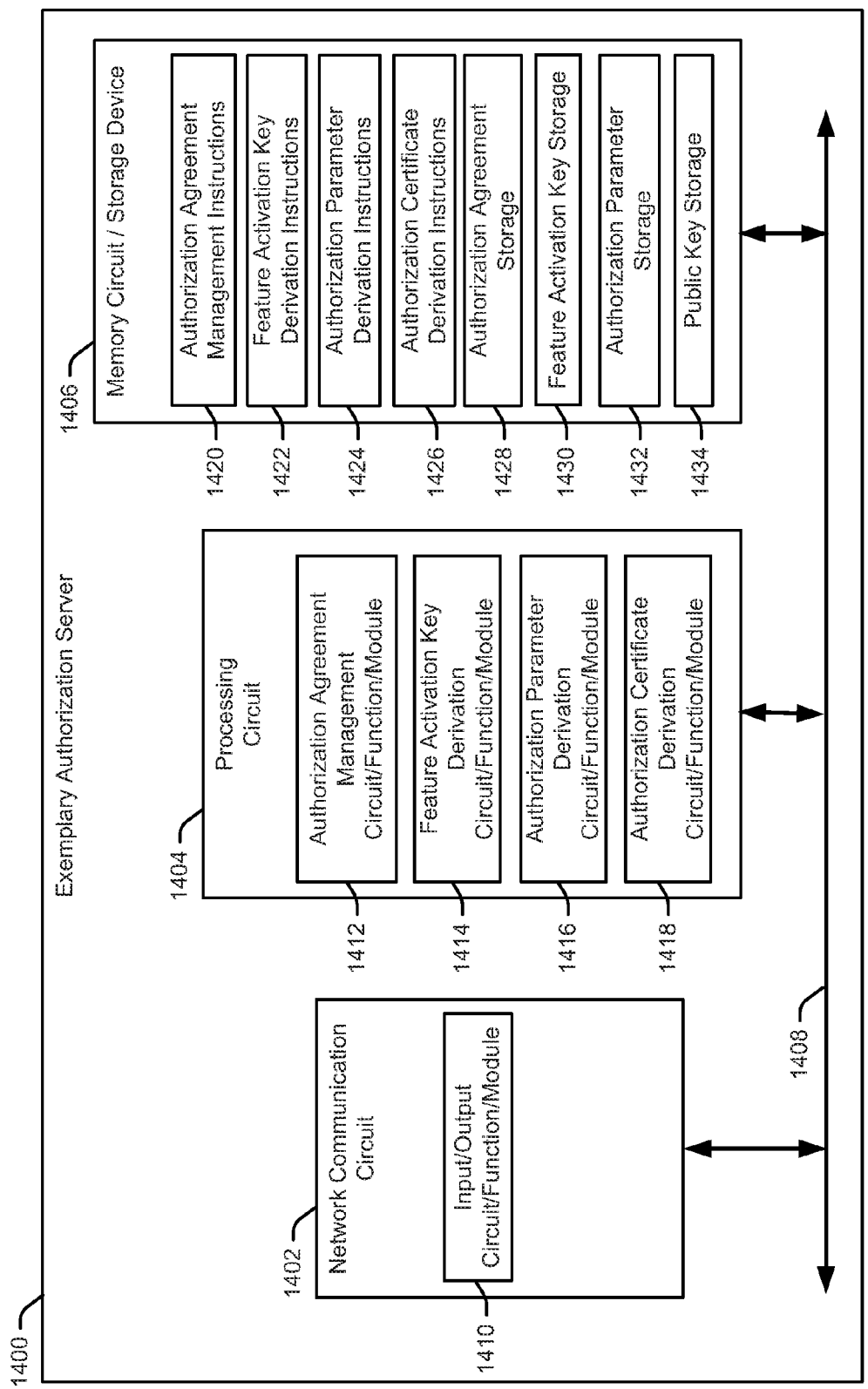
FIG. 14 is a block diagram illustrating an exemplary authorization server adapted to support dynamic authorization and activation of features to facilitate use of network services on a device in accordance with aspects described herein.

FIG. 14 is a block diagram illustrating an exemplary authorization server 1400 adapted to support dynamic authorization and activation of features to facilitate use of network services on a device (e.g., chip component, client device, network node) in accordance with aspects described herein. In one example, the exemplary authorization server 1400 may include a network communication circuit 1402, a processing circuit 1404, and a memory circuit/storage device (referred to herein as memory circuit 1406). The network communication circuit 1402, processing circuit 1404, and memory circuit 1406 may be coupled to a communication bus 1408 for exchange of data and instructions.

The network communication circuit 1402 may be adapted to include an input/output module/circuit/function 1410 for communication with network nodes such as a P-GW, a local authorization server, and/or a network access node. Other circuits/functions/modules may be included in the network communication circuit 1402 of the exemplary authorization server 1400 as will be known to those of skill in the art. The preceding information is exemplary and non-limiting.

The processing circuit 1404 may be adapted to include or implement one or more processors, application specific processors, hardware, and/or software modules, etc., that are adapted to support dynamic authorization and activation of features to facilitate use of network services on a device. The processing circuit 1404 may include an authorization agreement management circuit/function/module 1412, which may manage the collection, maintenance, and organization of authorization agreements stored in the exemplary authorization server 1400. The processing circuit 1404 may include a feature activation key derivation circuit/function/module 1414, which may be used to derive feature activation keys that may be used to activate features of devices (e.g., chip components, client devices, network nodes). The processing circuit 1404 may include an authorization parameter derivation circuit/function/module 1416, which may be used to derive authorization parameters (e.g., expiration date of an authorized feature) that may be passed to devices along with feature activation keys. The processing circuit 1404 may include an authorization certificate derivation circuit/function/module 1418, which may derive an authorization certificate based on an authorization agreement and may encrypt the authorization certificate with a public key of a device. Other circuits/functions/modules may be included in the processing circuit 1404 of the exemplary authorization server 1400 as will be known to those of skill in the art. The preceding information is exemplary and non-limiting.

The memory circuit 1406 may be adapted to include authorization agreement management instructions 1420, feature activation key derivation instructions 1422, authorization parameter derivation instructions 1424, authorization certificate derivation instructions 1426, as well as space for feature activation key storage 1430, authorization parameter storage 1432, public key storage 1434, and authorization certificate storage 1436. Other instructions and locations for storage of data may be included in the memory circuit 1406 as will be known to those of skill in the art. The preceding information is exemplary and non-limiting.

Exemplary Local Authorization Server

Figure 15:
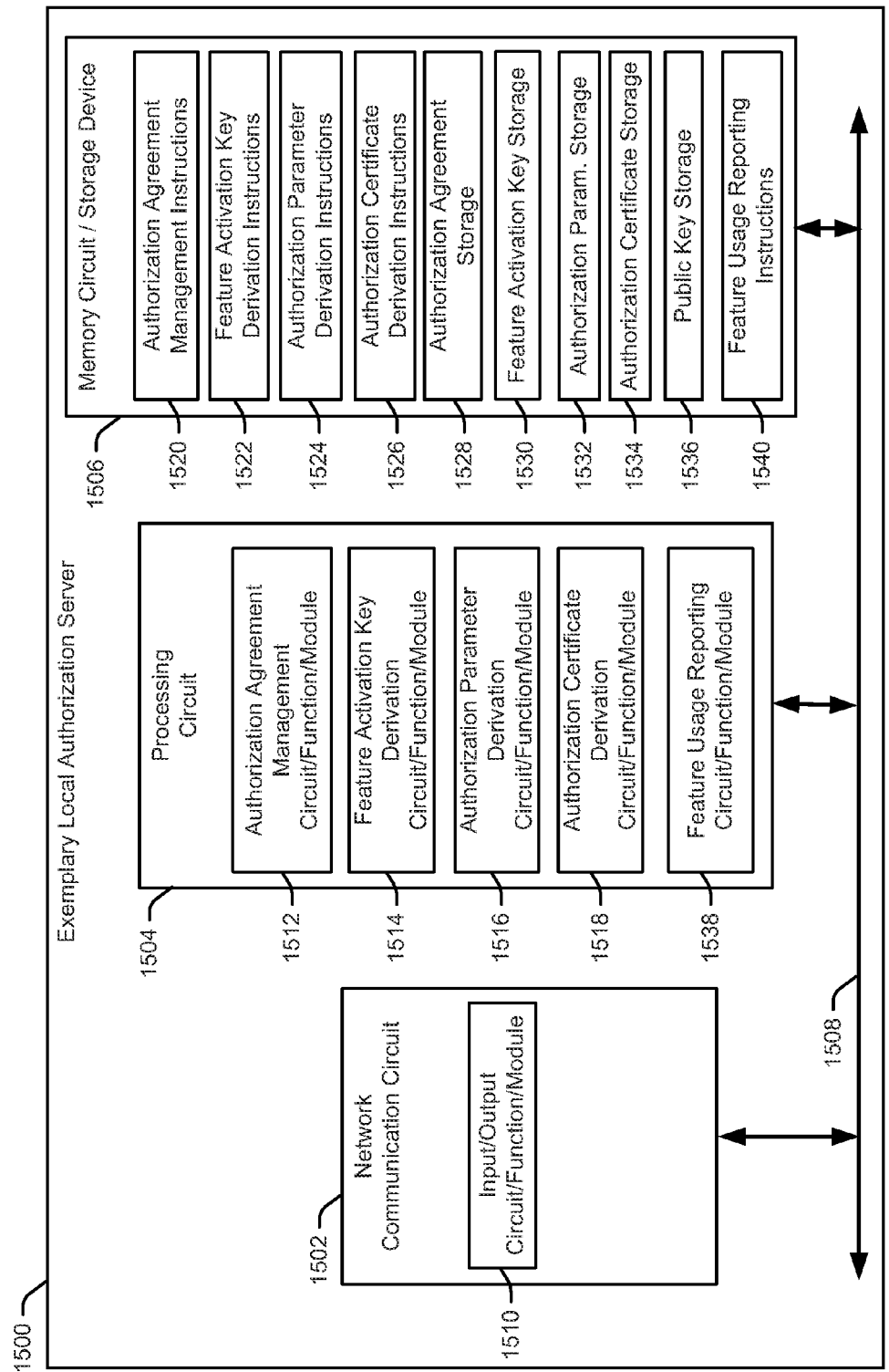
FIG. 15 is a block diagram illustrating an exemplary local authorization server adapted to support dynamic authorization and activation of features to facilitate use of network services on a device in accordance with aspects described herein.

FIG. 15 is a block diagram illustrating an exemplary local authorization server 500 adapted to support dynamic authorization and activation of features to facilitate use of network services on a device (e.g., chip component, client device, network node) in accordance with aspects described herein. The exemplary local authorization server 1500 may be a proxy for an authorization server (e.g., 1400, FIG. 14). In one example, the exemplary local authorization server 1500 may include a network communication circuit 1502, a processing circuit 1504, and a memory circuit/storage device (referred to herein as memory circuit 1506). The network communication circuit 1502, processing circuit 1504, and memory circuit 1506 may be coupled to a communication bus 1508 for exchange of data and instructions.

The network communication circuit 1502 may be adapted to include an input/output module/circuit/function 1510 for communication with network nodes such as an authorization server and/or a network access node. Other circuits/functions/modules may be included in the network communication circuit 1502 of the exemplary local authorization server 1500 as will be known to those of skill in the art. The preceding information is exemplary and non-limiting.

The processing circuit 1504 may be adapted to include or implement one or more processors, application specific processors, hardware, and/or software modules, etc., that are adapted to support dynamic authorization and activation of features to facilitate use of network services on a device. The processing circuit 1504 may include an authorization agreement management circuit/function/module 1512, which may manage the collection, maintenance, and organization of authorization agreements stored in the exemplary local authorization server 1500. The processing circuit 1504 may include a feature activation key derivation circuit/function/module 1514, which may be used to derive feature activation keys that may be used to activate features of devices. The processing circuit 1504 may include an authorization parameter derivation circuit/function/module 1516, which may be used to derive authorization parameters (e.g., expiration date of an authorized feature) that may be passed to devices along with feature activation keys. The processing circuit 1504 may include an authorization certificate derivation circuit/function/module 1518, which may derive an authorization certificate based, for example on data in an authorization agreement, and encrypt the authorization certificate with a public key of a device. The processing circuit 1504 may include a feature usage reporting circuit/function/module 1538, which may collect feature usage data from devices coupled to the exemplary local authorization server 1500. Other circuits/functions/modules may be included in the processing circuit 1504 of the exemplary local authorization server 1500 as will be known to those of skill in the art. The preceding information is exemplary and non-limiting.

The memory circuit 1506 may be adapted to include authorization agreement management instructions 1520, feature activation key derivation instructions 1522, authorization parameter derivation instructions 1524, authorization certificate derivation instructions 1526, as well as space for feature activation key storage 1530, authorization parameter storage 1532, authorization certificate storage 1534, and public key storage 1536. The memory circuit 1506 may also be adapted to include feature usage reporting instructions 1540. Other instructions and locations for storage of data may be included in the memory circuit 1506 as will be known to those of skill in the art. The preceding information is exemplary and non-limiting.

Exemplary Methods Operational at Server (e.g., Authorization Server or Local Authorization Server)

Figure 16:
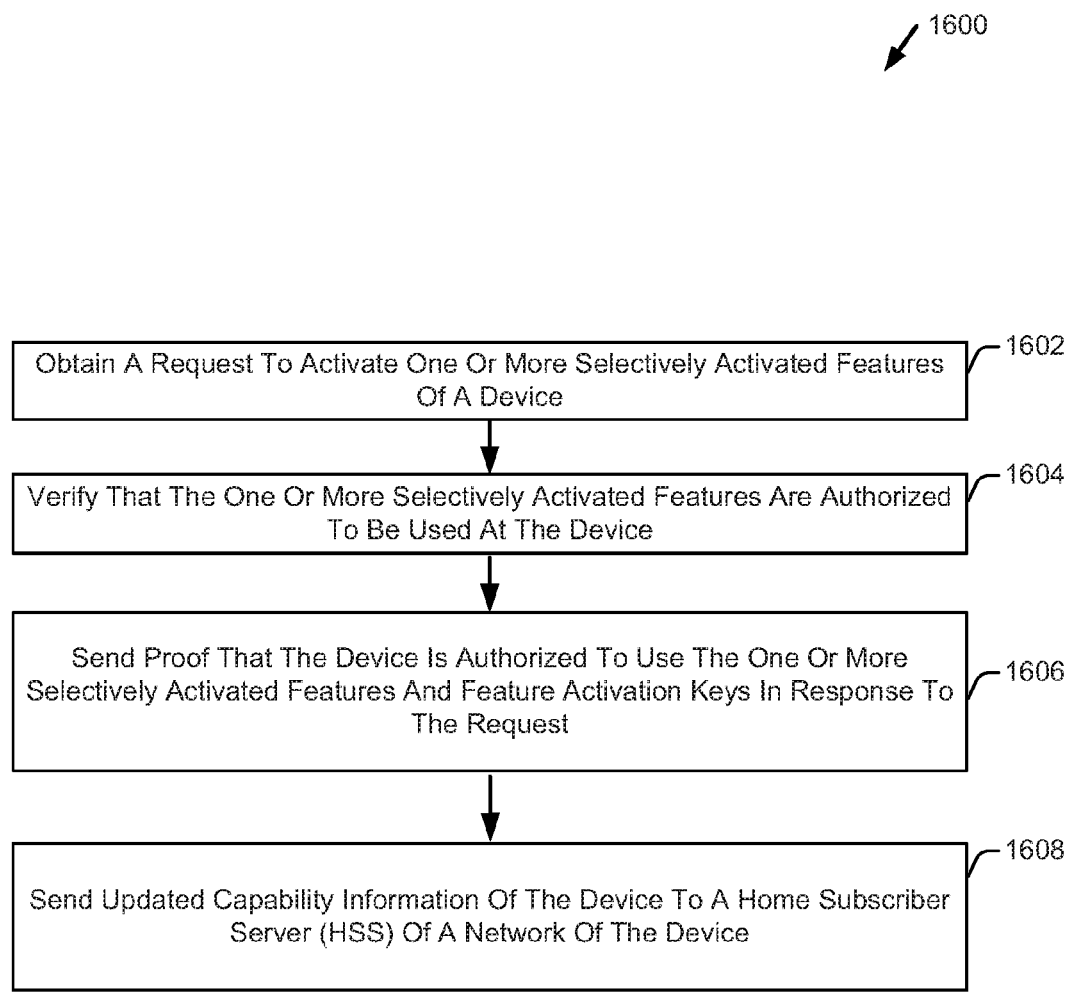
FIG. 16 is a flowchart of an exemplary method, which may be operational at an authorization server in accordance with aspects described herein.

FIG. 16 is a flowchart of an exemplary method 1600, which may be operational at an authorization server in accordance with aspects described herein. The authorization server may obtain a request to activate one or more selectively activated features of a device 1602 (e.g., a feature activation request). The one or more selectively activated features of the device may be included in a plurality of selectively activated features of the device. The authorization server may verify that the one or more selectively activated features are authorized to be used at the device 1604. The verification may be based on data obtained from an authorization agreement. The authorization agreement may be stored at the authorization server.

In some aspects, the authorization server may send proof that the device is authorized to use the one or more selectively activated features (e.g., authorization information) and one or more feature activation keys in response to the request to activate one or more selectively activated features 1606. The proof (e.g., authorization information) may be, for example, in the form of the authorization agreement and/or an authorization certificate.

In some aspects, the authorization server may send updated capability information of the device to a home subscriber server (HSS) of a network of the device 1608. In some implementations, the authorization server may send a notification to a network operator (e.g., MNO) advising the network operator to update the HSS of the network of the device by adding the one or more features as capabilities of the device. The authorization server may be different from an HSS and/or may be different from an authorization, authentication, and accounting (AAA) server.

The method may further include evaluating integrity information of the device, and sending the proof that the device is authorized to use the one or more selectively activated features and one or more feature activation keys if the integrity information is acceptable. In one aspect, the integrity information may be obtained by the authorization server. In other aspects, the integrity information may be obtained by a first server and provided to the authorization server, wherein the authorization server and the first server are different servers, and are not AAA servers. In such an aspect, the first server may be a proxy for the authorization server. For example, the first server maybe a local authorization server. Integrity information of a device may be a proof provided by the device that the device is running a legitimate software (i.e., the device is running authorized software, for example, related to feature activation/authorization, that can be verified by an authorization server). This can be done by a remote attestation by the authorization server, for example, see remote attestation 1019 in FIG. 10.

In some aspects, the method may also include receiving periodic feature activation and usage status data from devices receiving feature activation authorizations from the authorization server, and may further include enforcing authorization agreements by controlling feature activation authorizations based on terms of the authorization agreements stored in the authorization server.

Figure 17:
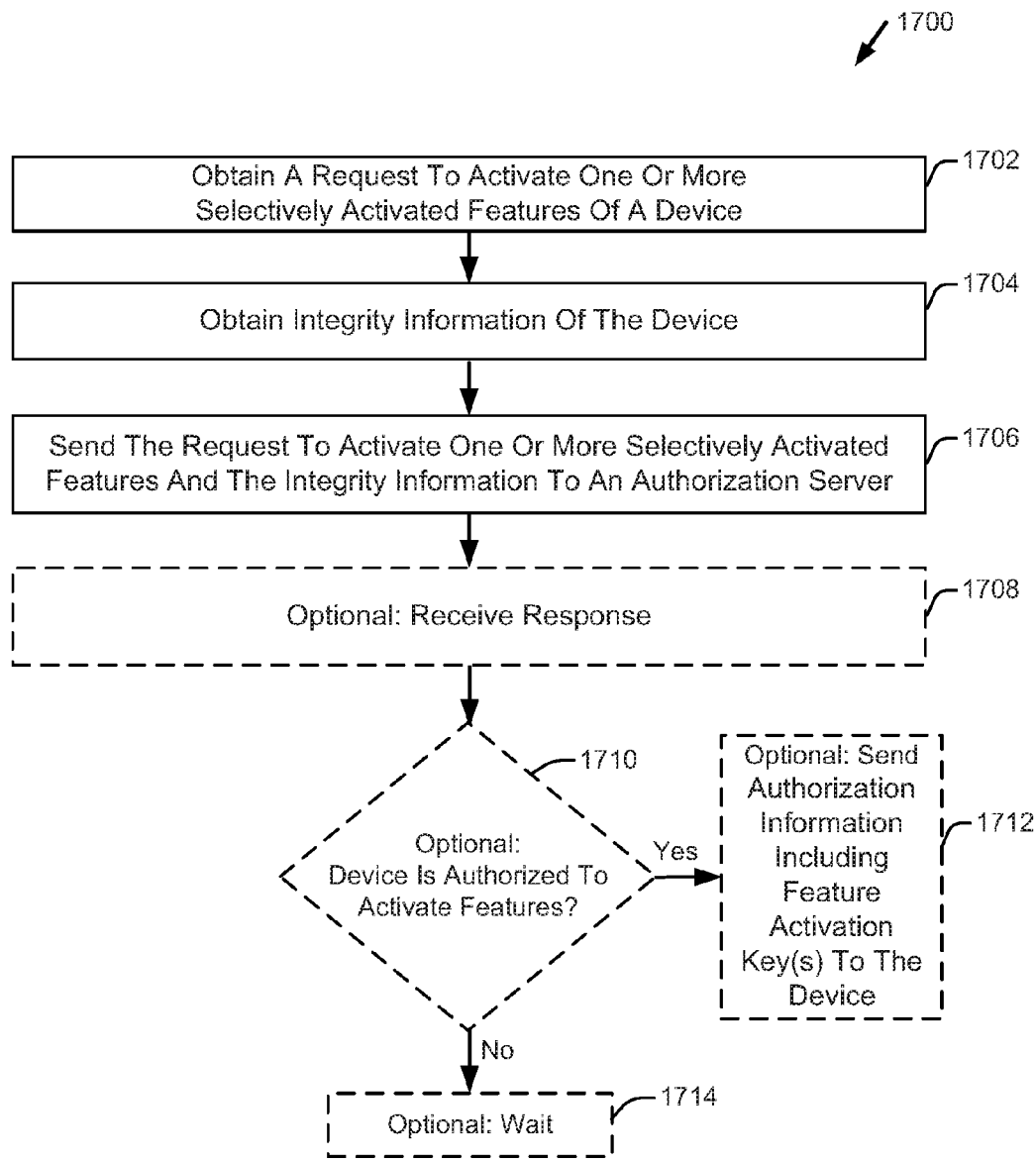
FIG. 17 is a flowchart of an exemplary method, which may be operational at a local authorization server in accordance with aspects described herein.

FIG. 17 is a flowchart of an exemplary method 1700, which may be operational at a local authorization server in accordance with aspects described herein. The local authorization server may obtain a request to activate one or more selectively activated features of a device 1702. The local authorization server may obtain integrity information of the device 1704. The local authorization server may send the request to activate one or more selectively activated features and the integrity information to an authorization server 1706.

In some aspects, the authorization server is different from the local authorization server and both are different from an authorization, authentication, and accounting (AAA) server of a network of the device.

The method operational at the local authorization server may optionally and additionally include receiving a response to the request to activate one or more features of the device 1708. Receiving the response may include obtaining authorization information indicating that the device is authorized to activate the one or more selectively activated features, wherein the authorization information includes one or more feature activation keys respectively corresponding to the one or more selectively activated features.

The local authorization server may then determine, based on the response, if the device is authorized to activate the one or more selectively activated features 1710. The method may further include sending the authorization information and the one or more feature activation keys to the device if the device is authorized to activate the feature(s) 1712. However, if the response indicates that the device is not authorized to activate the one or more selectively activated features, the method may wait 1714, for example until the local authorization server receives a new request to activate one or more features of the device, or another device (e.g., returns to 1702).

One or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the disclosure. The algorithms described herein may also be efficiently implemented in software and/or embedded in hardware.

In the description, elements, circuits, functions, and modules may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It is readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Also, it is noted that the embodiments may be described as a process that s depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity f presentation and description. It will be understood by a person of ordinary skill in the art that the signal may represent a bus of signals, wherein the bus may have a variety of bit widths and the present disclosure may be implemented on any number of data signals, including a single data signal.

It should be understood that any reference to an element herein using a designation such as "first," "second," and so forth does not limit the quantity or order of those elements, unless such limitation is explicitly stated. Rather, the designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements. Furthermore, it should be understood that words used in the singular include the plural and words used in the plural include the singular.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, processing circuit-readable mediums, and/or computer-readable mediums for storing information. The terms "machine-readable medium," "processor-readable medium," "processing circuit-readable medium," and/or "computer-readable medium" may include, but are not limited to non-transitory mediums such as portable or fixed storage devices, optical storage devices, and various other mediums capable of storing, containing, or carrying instruction(s) and/or data. Thus, the various methods described herein may be fully or partially implemented by instructions and/or data that may be stored in a machine-readable medium, processor-readable medium, processing circuit-readable medium, and/or computer-readable medium and executed by one or more processing circuits, machines, and/or devices.

Furthermore, embodiments may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processing circuit may perform the necessary tasks. A code segment may represent a process, a procedure, a function, a subprogram, a program, a routine, a subroutine, a module, a software package, a class, or any combination of instructions, data structures, or program statements. A code segment may be coupled to another code segment or a hardware circuit by passing, forwarding, or transmitting information, data, arguments, parameters, or memory contents. Information, data, arguments, parameters, or memory contents may be passed, forwarded, or transmitted via any suitable means including memory sharing, message passing, token passing, network transmission, etc.

The various illustrative logical blocks, elements, circuits, module functions, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic discrete hardware components, or any combination thereof designed to perform the functions described herein. A general-purpose processor may be a microprocessor, hut in the alternative, the general-purpose processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing embodiments described herein, is considered a special purpose processor for carrying out such embodiments. Similarly, a general-purpose computer is considered a special purpose computer when configured for carrying out embodiments described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known to those of skill in the art. A storage medium may be coupled to the processor such that the processor can read information from, and write information to, the storage medium. In the alternative, the storage medium may be integral to the processor.

Those of skill in the art would further appreciate that the various illustrative logical blocks, circuits, functions, modules, and algorithms described in connection with the embodiments disclosed herein may be implemented as electronic hardware, computer software, or combinations of both. To clearly illustrate this interchangeability of hardware and software, various illustrative elements, components, blocks, circuits, functions, modules, and algorithms have been described above generally in terms of their functionality. Whether such functionality is implemented as hardware, software, or a combination thereof depends upon the particular application and design selections imposed on the overall system.

The various features of the disclosure described herein can be implemented in different systems without departing from the disclosure. It should be noted that the foregoing embodiments are merely examples and are not to be construed as limiting the disclosure. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method, operational at a device, comprising:
    identifying one or more selectively activated features needed at the device to use a network service;
    obtaining authorization information and one or more feature activation keys associated with features that the device has been authorized to activate; and
    using the one or more feature activation keys to activate and/or maintain activation of the features that the device has been authorized to activate that match the one or more selectively activated features needed to use the network service.

2. The method of claim 1, further comprising, prior to identifying the one or more selectively activated features needed to use the network service, obtaining information that indicates the network service is available from a network access node.

3. The method of claim 1, wherein the one or more selectively activated features are hardware and/or software features.

4. The method of claim 1, further comprising:
sending the authorization information to another device and/or node as proof that the device is authorized to activate a feature identified in the authorization information.

5. The method of claim 1, wherein obtaining the authorization information and one or more feature activation keys includes:
sending a request to authorize activation of one or more features;
obtaining the authorization information and one or more feature activation keys in response to the request to authorize activation of the one or more features; and
storing the authorization information and feature activation keys.

6. The method of claim 1, wherein the authorization information includes, for features that the device has been authorized to activate, a date upon which authorization will expire.

7. The method of claim 1, wherein the authorization information is obtained as data representative of an authorization certificate.

8. The method of claim 7, wherein the authorization certificate is signed by an authorization server that stores an authorization agreement from which the authorization certificate is based.

9. The method of claim 1, wherein identifying the one or more selectively activated features needed to use the network service, comprises:
obtaining from a network access node a list of features needed to use the network service.

10. The method of claim 1, wherein identifying the one or more selectively activated features needed to use the network service, comprises:
obtaining from a memory circuit of the device, a list of features needed to use the network service.

11. The method of claim 1, wherein at least one of the selectively activated features needed to use the network service is licensable upon use and is activated when verification of an up-to-date license is obtained at the device.

12. A device, comprising:
a network communication circuit to communicate with a network node; and
a processing circuit coupled to the network communication circuit, the processing circuit configured to:
identify one or more selectively activated features needed at the device to use a network service;
obtain authorization information and one or more feature activation keys associated with features that the device has been authorized to activate; and
use the one or more feature activation keys to activate and/or maintain activation of the features that the device has been authorized to activate that match the one or more selectively activated features needed to use the network service.

13. The device of claim 12, wherein the processing circuit is further configured to:
obtain information that indicates the network service is available from a network access node, prior to identifying the one or more selectively activated features needed to use the network service.

14. The device of claim 12, wherein the processing circuit is further configured to:
send the authorization information to another device and/or node as proof that the device is authorized to activate a feature identified in the authorization information.

15. A method, operational at a device, comprising:
obtaining an over-the-air broadcast identifying a network service that is available from a network access node;
identifying one or more selectively activated features needed by the device to use the network service;
identifying features that the device has been authorized to activate;
determining if a match exists between the identified one or more selectively activated features needed by the device to use the network service and features that the device has been authorized to activate; and
using, if the match exists, feature activation keys of the features that the device has been authorized to activate to activate and/or maintain activation of the features that the device has been authorized to activate that match the identified one or more selectively activated features needed by the device to use the network service.

16. The method of claim 15, further comprising, prior to receiving the over-the-air broadcast, obtaining authorization information and one or more feature activation keys used to activate and/or maintain activation of one or more selectively activated features that the device has been authorized to activate.

17. The method of claim 15, wherein the network access node from which the over-the-air broadcast is received is unauthenticated and is not attached to the device.

18. The method of claim 15, further comprising
identifying, from the identified one or more selectively activated features needed by the device to use the network service, features that the device has not been authorized to activate;
sending a request for authorization information and feature activation keys for the features that the device has not been authorized to activate; and
using feature activation keys, obtained in response to the request, to activate the features that the device has not been authorized to activate.

19. The method of claim 15, wherein the over-the-air broadcast is responsive to a query sent from the device that identified the one or more selectively activated features needed on the device to use the network service.

20. The method of claim 15, wherein identifying the one or more selectively activated features needed on the device to use the network service, includes:
obtaining from a memory circuit of the device, a list of features needed to use the network service.

21. The method of claim 15, wherein identifying the one or more selectively activated features needed on the device to use the network service, includes:
obtaining from the network access node a list of features needed to use the network service.

22. A device, comprising:
a network communication circuit to communicate with a network access node; and
a processing circuit coupled to the network communication circuit, the processing circuit configured to:
obtain an over-the-air broadcast identifying a network service that is available from the network access node;

identify one or more selectively activated features needed by the device to use the network service;

identify features that the device has been authorized to activate;

determine if a match exists between the identified one or more selectively activated features needed by the device to use the network service and features that the device has been authorized to activate; and use, if the match exists, feature activation keys of the features that the device has been authorized to activate to activate and/or maintain activation of the features that the device has been authorized to activate that match the identified one or more selectively activated features needed by the device to use the network service.

23. The device of claim 22, wherein the processing circuit is further configured to:

obtain authorization information and one or more feature activation keys used to activate and/or maintain activation of one or more selectively activated features that the device has been authorized to activate, prior to receiving the over-the-air broadcast.

24. The device of claim 22, wherein the processing circuit is further configured to:

identify, from the identified one or more selectively activated features needed by the device to use the network service, features that the device has not been authorized to activate;

send a request for authorization information and feature activation keys for the features that the device has not been authorized to activate; and use feature activation keys, obtained in response to the request, to activate the features that the device has not been authorized to activate.

25. A method, operational at an authorization server, comprising:

obtaining, at the authorization server, a request to activate one or more selectively activated features of a device;

verifying that the one or more selectively activated features are authorized to be used at the device based on an authorization agreement obtained at the authorization server;

sending proof that the device is authorized to use the one or more selectively activated features and one or more feature activation keys based on the authorization agreement in response to the request to activate one or more selectively activated features; and sending updated capability information of the device to a home subscriber server (HSS) of a network of the device.

26. The method of claim 25, wherein the authorization server is different from the HSS and different from an authorization, authentication, and accounting (AAA) server.

27. The method of claim 25, further comprising:

evaluating integrity information of the device; and sending the proof that the device is authorized to use the one or more selectively activated features and one or more feature activation keys if the integrity information is acceptable.

28. The method of claim 27, wherein the integrity information is obtained from a first server by the authorization server, wherein the authorization server and the first server are different servers.

29. The method of claim 28, wherein the first server is a proxy for the authorization server.

30. The method of claim 28, wherein the authorization server and the first server are different from an authorization, authentication, and accounting (AAA) server.

31. The method of claim 25, further comprising:

receiving periodic feature activation and usage status data from devices receiving feature activation authorizations from the authorization server; and enforcing authorization agreements by controlling feature activation authorizations based on terms of the authorization agreements stored in the authorization server.

32. An authorization server, comprising:

a network communication circuit to communicate with a network of a device; and a processing circuit coupled to the network communication circuit, the processing circuit configured to:

obtain, at the authorization server, a request to activate one or more selectively activated features;

verify that the one or more selectively activated features are authorized to be used at the device;

send proof that the device is authorized to use the one or more selectively activated features and one or more feature activation keys in response to the request to activate one or more selectively activated features; and send updated capability information of the device to a home subscriber server (HSS) of the network of the device.

33. The authorization server of claim 32, wherein the processing circuit is further configured to:

evaluate integrity information of the device; and send the proof that the device is authorized to use the one or more selectively activated features and one or more feature activation keys if the integrity information is acceptable.

34. The authorization server of claim 32, wherein the processing circuit is further configured to:

receive periodic feature activation and usage status data from devices receiving feature activation authorizations from the authorization server; and enforce authorization agreements by controlling feature activation authorizations based on terms of the authorization agreements stored in the authorization server.

35. A method operational at a local authorization server, comprising:

obtaining, at the local authorization server, a request to activate one or more selectively activated features of a device;

obtaining integrity information of the device; and sending the request to activate one or more selectively activated features and the integrity information to an authorization server.

36. The method of claim 35, wherein the authorization server is different from the local authorization server and both are different from an authorization, authentication, and accounting (AAA) server of a network of the device.

37. The method of claim 35, further comprising:

obtaining authorization information indicating that the device is authorized to activate the one or more selectively activated features, wherein the authorization information includes one or more feature activation keys respectively corresponding to the one or more selectively activated features; and sending the authorization information and the one or more feature activation keys to the device.

38. A local authorization server, comprising:

a network communication circuit to communicate with an authorization server; and a processing circuit coupled to the network communication circuit, the processing circuit configured to:
  obtain, at the local authorization server, a request to activate one or more selectively activated features of a device;
  obtain integrity information of the device; and
  send the request to activate one or more selectively activated features and the integrity information to the authorization server.

39. The local authorization server of claim 38, wherein the processing circuit is further configured to:
  obtain authorization information indicating that the device is authorized to activate the one or more selectively activated features, wherein the authorization information includes one or more feature activation keys respectively corresponding to the one or more selectively activated features; and
  send the authorization information and the one or more feature activation keys to the device.

* * * * *